United States Patent
Radhakrishnan et al.

(10) Patent No.: US 8,468,278 B2
(45) Date of Patent: Jun. 18, 2013

(54) METHODS AND APPARATUSES FOR FLUSHING WRITE-COMBINED DATA FROM A BUFFER

(75) Inventors: Sivakumar Radhakrishnan, Portland, OR (US); Siva Balasubramanian, Chandler, AZ (US); William T. Futral, Portland, OR (US); Sujoy Sen, Portland, OR (US); Gregory D. Cummings, Portland, OR (US); Kenneth C. Creta, Gig Harbor, WA (US); David C. Lee, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 139 days.

(21) Appl. No.: 11/966,760

(22) Filed: Dec. 28, 2007

(65) Prior Publication Data

US 2009/0031058 A1    Jan. 29, 2009

Related U.S. Application Data

(63) Continuation of application No. 10/977,235, filed on Oct. 29, 2004, now Pat. No. 7,353,301.

(51) Int. Cl.
  *G06F 13/00*    (2006.01)
(52) U.S. Cl.
  USPC ............................................ 710/33; 710/107

(58) Field of Classification Search
  USPC ...................................................... 710/33, 107
  See application file for complete search history.

(56) References Cited

U.S. PATENT DOCUMENTS

| | | | |
|---|---|---|---|
| 6,009,488 A | 12/1999 | Kavipurapu | |
| 6,101,568 A | 8/2000 | Richardson | |
| 2002/0087801 A1 | 7/2002 | Bogin et al. | |
| 2003/0023666 A1 | 1/2003 | Conway et al. | |
| 2004/0015503 A1 | 1/2004 | Smith et al. | |
| 2004/0158677 A1 * | 8/2004 | Dodd | 711/118 |
| 2005/0071534 A1 | 3/2005 | Kwatra | |
| 2010/0332686 A1 * | 12/2010 | Creta et al. | 710/5 |

OTHER PUBLICATIONS

Thomas R. Craver, "Hyper-Threading Technology and Write Combining Store Buffers: Understanding, Detecting and Correcting Performance Issues", Intel Software Network, Jul. 18, 2005, http://www.intel.com/cd/ids/developer/asmo-na/eng/20465.htm?pm=Y, 11 pages.

Raoul A. F. Bhoedjang, et al., "User-Level Network Interface Protocols", IEEE, Nov. 1998, pp. 53-60.

* cited by examiner

*Primary Examiner* — Chun-Kuan Lee
*Assistant Examiner* — David Martinez
(74) *Attorney, Agent, or Firm* — Blakely, Sokoloff, Taylor & Zafman LLP

(57) ABSTRACT

Methods and apparatuses for flushing write-combined data from a buffer within a memory to an input/output (I/O) device.

8 Claims, 14 Drawing Sheets

METHODS AND APPARATUSES FOR FLUSHING WRITE-COMBINED DATA FROM A BUFFER

CROSS-REFERENCE TO RELATED APPLICATIONS

This application is a Continuation of claims of U.S. patent application Ser. No. 10/977,235, filed Oct. 29, 2004, now U.S. Pat. No. 7,353,301, entitled "Methodology and Apparatus for Implementing Write Combining," which is hereby incorporated by reference in its entirety into this application.

FIELD OF THE INVENTION

One or more embodiments of the invention relate generally to the field of integrated circuit and computer system design. More particularly, one embodiment of the invention relates to a method and apparatus for flushing write-combined data to an input/output device.

BACKGROUND OF THE INVENTION

The development of ever more advanced microprocessors and associated bus architectures continues at a rapid pace. Current computer systems employ advanced architectures and processors such as Pentium Pro®, Pentium II®, Pentium III®, and Pentium IV® processors, as manufactured by the Intel Corporation of Santa Clara, Calif. In such computer systems, the bus architecture is optimized for burst performance. Generally, the bus architecture may include dedicated buses for one-to-one coupling of devices, or non-dedicated buses that are multiplexed by a number of units and devices (e.g., bus agents). By optimizing the bus architecture for burst performance, the system processor is able to achieve very high memory and I/O bandwidths.

One technique for providing burst performance is provided by caching of data within either the level one (L1) or level two (L2) caches available to the processor. For example, when the processor recognizes that an operand being read from memory is cacheable, the processor reads an entire cache line into the appropriate cache. This operation is generally referred to as a "cache line fill." Likewise, write operations to memory are cached and written to memory in cache line burst write cycles. Unfortunately, within certain applications, such as I/O applications, write operations from the processor are most often pixel write operations. As a result, the write operations tend to be 8-bit, 16-bit or 32-bit quantities, rather than the full cache lines required to provide burst performance.

As a result, a processor is normally unable to run burst cycles for graphics operations. To address this problem, advanced computer architectures are designed to use a new caching method, or memory type that allows internal buffers of the processor to be used to combine smaller or partial writes (automatically) into larger burstable cache line writes, which is referred to herein as "write-combining." In order to provide write-combining within a memory region, the memory region is defined as having a write-combining (WC) memory type.

However, the WC memory type is a weakly ordered memory type. System memory locations designated as WC are not cached, and coherency is not enforced by the processor's coherency protocol. In addition, writes may be delayed and combined in the write-combining buffers to reduce partial memory writes. Unfortunately, processor write-combining makes no guarantees with respect to the order in which bits are flushed from the write-combining buffers. Write combining buffers may be flushed prematurely due to interrupts, errors, context switches, paging and other events that result in frequent evictions. As a result, the burst performance capability provided by write-combining may not be useful to applications which have strict requirements as to the order in which bits are flushed from the write-combining buffers. Furthermore, the available write-combining buffer sizes may be insufficient for certain applications which require high efficiency.

Processor write combining has been typically used in the past for graphics application through the uncacheable speculative write combining approach coupled with the push model. However, this is very limited in scope in multi-processing systems, particularly for local area network (LAN) applications due to weak ordering rules, frequent flushes due to context switches and discontinuous packets that are evicted.

Over the last two decades processor and memory performance have been increasing, but at significantly different rates: processor performance has increased at the rate of roughly ~55% per year while dynamic random access memory (DRAM) latencies have decreased only at the rate of ~7% per year and DRAM bandwidths have only increased at the rate of ~20% per year (Hennessay, H.; Patterson, D. A., "Computer Architecture: A Quantitative Approach," Second edition, Morgan Kaufman, 1996). This has led to the well-known memory-wall problem: the ever-widening gap between processor and memory performance reducing the final delivered processor performance. Despite extensive research on processor techniques to tolerate long memory latencies such as pre-fetching, out-of-order execution, speculation, multi-threading, etc., memory latency continues to be an increasingly important factor of processor stall times. Moreover, many of these processor techniques to tolerate memory latencies have resulted in increasing the bandwidth demand on the memory subsystem.

System performance depends not only on the peak bandwidth and idle latency but also on the actual maximum sustainable bandwidth and the queuing latency encountered by the application during execution and hence, the loaded latency (idle+queuing latency). For a given architecture and workload, the loaded latency and sustainable bandwidth can vary quite widely depending on the memory controller features.

SUMMARY OF THE DESCRIPTION

Methods and apparatuses for flushing write-combined data from a buffer are described including the following: write-combining outbound write transactions intended for one or more I/O devices by storing the associated data within a buffer assigned to a range of addresses within a memory address space mapped to the I/O device; buffering a flush request from the I/O device within the mapped memory address space if the flush request is targeted to a register within the mapped memory address space assigned to receive flush requests from the I/O device; and flushing the data contents of the buffer to the I/O device.

BRIEF DESCRIPTION OF THE DRAWINGS

A better understanding of at least certain embodiments of the present invention can be obtained from the following detailed description in conjunction with the following drawings, in which.

DETAILED DESCRIPTION

Embodiments of the present invention improve efficiency of a server chipsets used in local area network (LAN), Blade server, and/or Gigabit Ethernet I/O applications by performing on-chip write combining operations in the north bridge or memory control hub component that increases overall network throughput and bus utilization. The write combining described herein attempts to solve limitations in the prior art through the implementation of intelligent chipset hardware, specialized ordering/flush rules and interaction with a device driver that exploits these features to increase system performance. In addition, in one embodiment, the efficiency of PCI-Express (the backbone input/output (I/O) link that connects chipsets to I/O devices) is improved as result of larger outbound write packets that are dispatched to the target I/O device than what the central processing unit (CPU) is capable of generating. [The PCI Express™ bus interface protocol is defined by the PCI Express Base Specification, Revision 1.0a (Apr. 15, 2003)]

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

An Exemplary System Architecture

Figure 1:
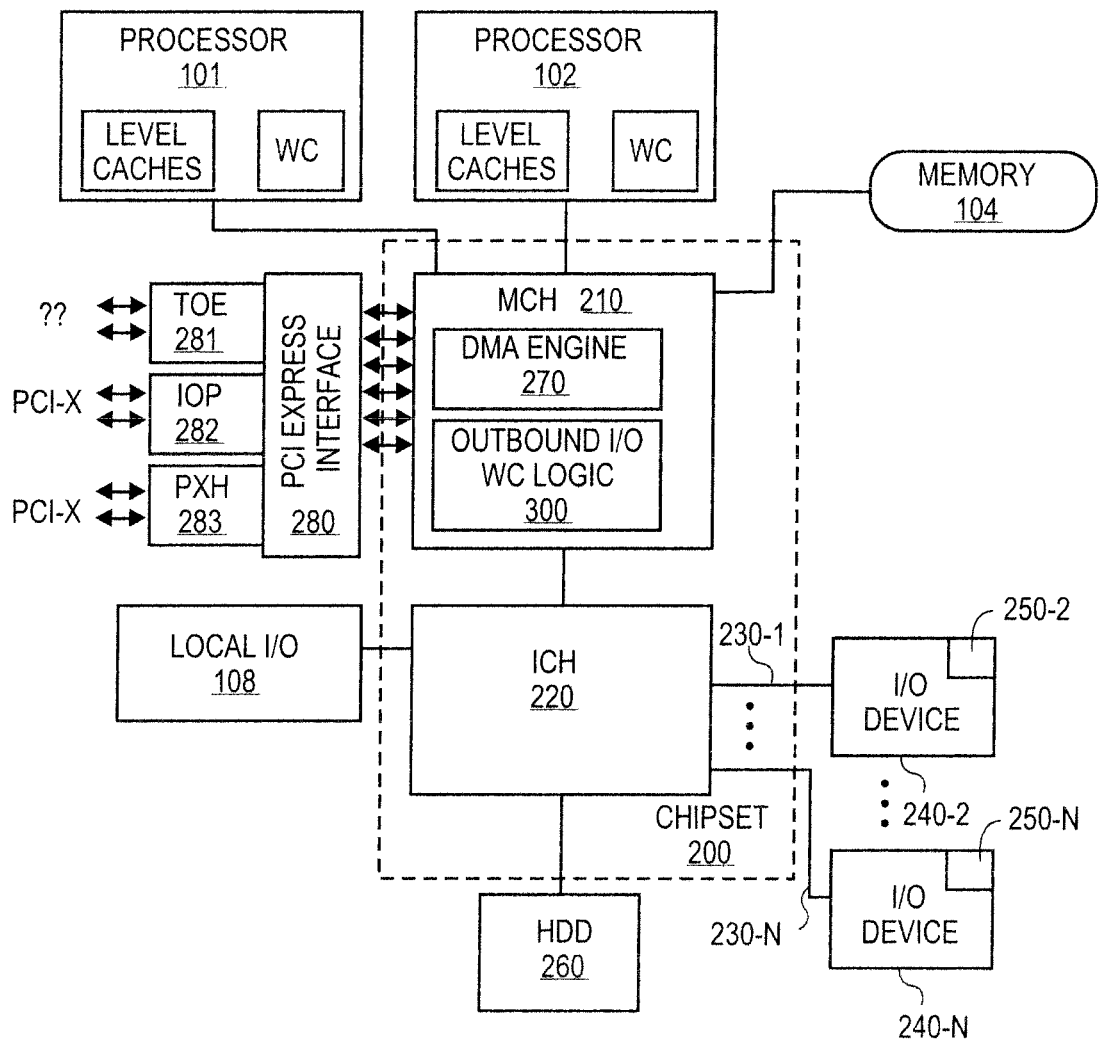
FIG. 1 depicts computer system, including outbound I/O (input/output) write-combining logic, in accordance with one embodiment of the present invention.

FIG. 1 is a block diagram of one embodiment of a computer system 100, including outbound I/O (input/output) write-combining logic 300. Referring to FIG. 1, computer system 100 includes processors 101 and 102, memory 104 coupled to memory controller hub (MCH) 210. As described herein, memory controller hub 210 may comprise a memory controller and, in one embodiment, may be a north bridge.

Although computer system 100 shows only two processors, computer system 100 may have more or less than two processors. In one embodiment, processors 101 and 102 include one or more caches (e.g., a Level 0 cache, a Level 1 cache, a Level 2 cache, etc.) and write combining logic.

Computer system 100 also includes PCI Express interface 280 that is coupled to MCH 210 via a number of ports. In one embodiment, 6 ports couple PCI interface 280 to interface PCI Express I/O port (IOP) 282, PCI Express hub 283 and TCP/IP off-load engine (TOE) 281, both of which provide a PCI Express interface to MCH 210. In one embodiment, TOE 281 is an Ethernet adapter responsible for running the TCP/IP stack and is interfaced to Ethernet. In one embodiment, TOE 281 is part of a network interface card (NIC).

To utilize PCI Express interface 280 and the devices coupled thereto, MCH 210 includes DMA engine 270. DMA engine 270 is programmed by TOE adapter 281 to move data out to and in from the network (e.g., via Ethernet).

In addition, computer system 100 includes I/O controller hub (ICH) 220, which is coupled to local I/O 108 and hard disk drive devices (HDD) 260. In the embodiment illustrated, I/O controller hub 220 is coupled to I/O bus 230, which is coupled to I/O devices 240 (240, ..., 240-N). As described herein, the I/O controller hub 220 may comprise an I/O controller. Collectively, MCH 210 and ICH 220 are referred to as chipset 200. As described herein, the term "chipset" is used in a manner well known to those skilled in the art to describe, collectively, the various devices coupled to processors 101 and 102 to perform desired system functionality.

In one embodiment, chipset 200 includes outbound I/O write-combining logic 300. In the embodiment depicted, outbound I/O write-combining logic 300 is illustrated within MCH 210. However, write-combining logic 300 may be performed within a chipset which does not include separate MCH and ICH. As described in further detail below, write-combining logic 300 is provided to combine write operations directed to I/O devices 240 of I/O bus 230 and devices coupled to IOP 282, and PxH 283, and TOE 281. In one embodiment, write-combining is provided for write transactions directed to I/O devices coupled to the chipset 200 via, for example, a peripheral component interconnect (PCI) express (PCI Express) interface.

As known to those skilled in the art, I/O devices may be accessed by mapping a portion of the processor's physical memory address space to the various I/O device ports. When using memory mapped I/O, the memory mapped I/O space is generally designated as uncacheable memory. The uncacheable memory type designation is enforced in I/O devices, since I/O devices generally have very strict ordering requirements for reads and writes.

In one embodiment, network connection between MCH 210 and TOE 281 is performed using the Ethernet controller model with a push feature that reduces the overhead involved with Ethernet device transmits (i.e. when the Ethernet device sends a packet) by pushing descriptors directly into the TOE adapter's MMIO space and avoiding a long round trip descriptor fetch latency that is significant for high speed multi-Gigabit Ethernet devices. In this push model, the device driver issues a large descriptor write to the network interface card (NIC), thereby avoiding the round trip latency to memory and increases system performance and reduces snoops. In response thereto, the NIC obtains the data and transmits it out through the Ethernet back plane (e.g., connector). In one embodiment, this is on the order of 64 or more bytes.

In contrast, the traditional DMA model involves a pull operation in which I/O devices access the system memory using a burst mode. This is typically quite expensive in applications such as 10 Gb Ethernet LAN based servers where the impact of round-trip latency is pronounced and has a direct impact on the ability of the Gigabit network interface card (NIC) to sustain its maximum throughput. In the pull DMA model, the descriptors are created in memory and NIC device performs a DMA access incurring a large latency overhead.

By providing write combining hardware in the chipset, the larger packets that are accumulated in the write combining (WC) buffers and transmitted across PCI Express links will translate directly into improved system performance. Efficient combining of outbound partial writes improves PCI Express utilization (larger packet sizes), eliminates snoops, enforces ordering and increases TOE performance through the push model.

Figure 2:
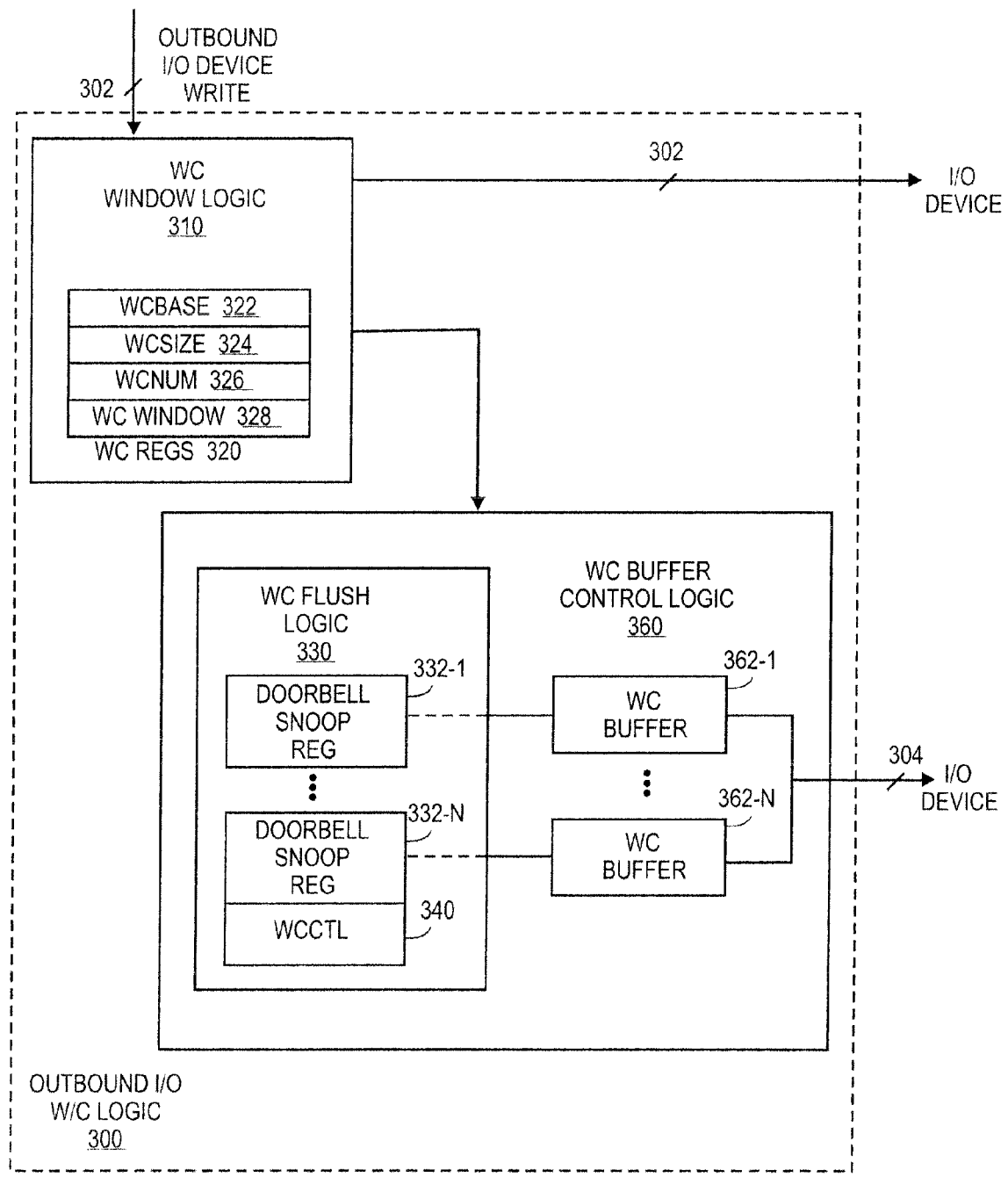
FIG. 2 depicts a block diagram further illustrating the outbound I/O write-combining logic of computer system, as depicted in FIG. 1, in accordance with a further embodiment of the present invention.

Accordingly, one embodiment I/O write-combining logic 300 is further illustrated with reference to FIG. 2. Referring to FIG. 2, the outbound write-combining logic 300 includes write-combining window logic 310. The write-combining window logic includes multiple write-combining registers (WCREGS) 320. In one embodiment, these registers include write-combining base (WCBASE) register 322, write-combining size (WCSIZE) register 324, write-combining number (WCNUM) register 326 and write-combining window (WCWINDOW) register 328. These registers may be in the PCI Express configuration register space.

In one embodiment, WCBASE 322 specifies an address within the memory mapped I/O space selected as the write-combining base address. In this embodiment, WCSIZE 324 specifies the size of one or more write-combinable ranges. Likewise WCNUM register 326 specifies the number of write-combinable ranges within the memory mapped region assigned to a respective I/O device. Finally, WCWINDOW register 328 specifies the size of the write-combining window(s). In one embodiment, I/O device driver software sets the values with WCREGS 320 to direct the chipset's implementation of outbound I/O write-combining.

Figure 3:
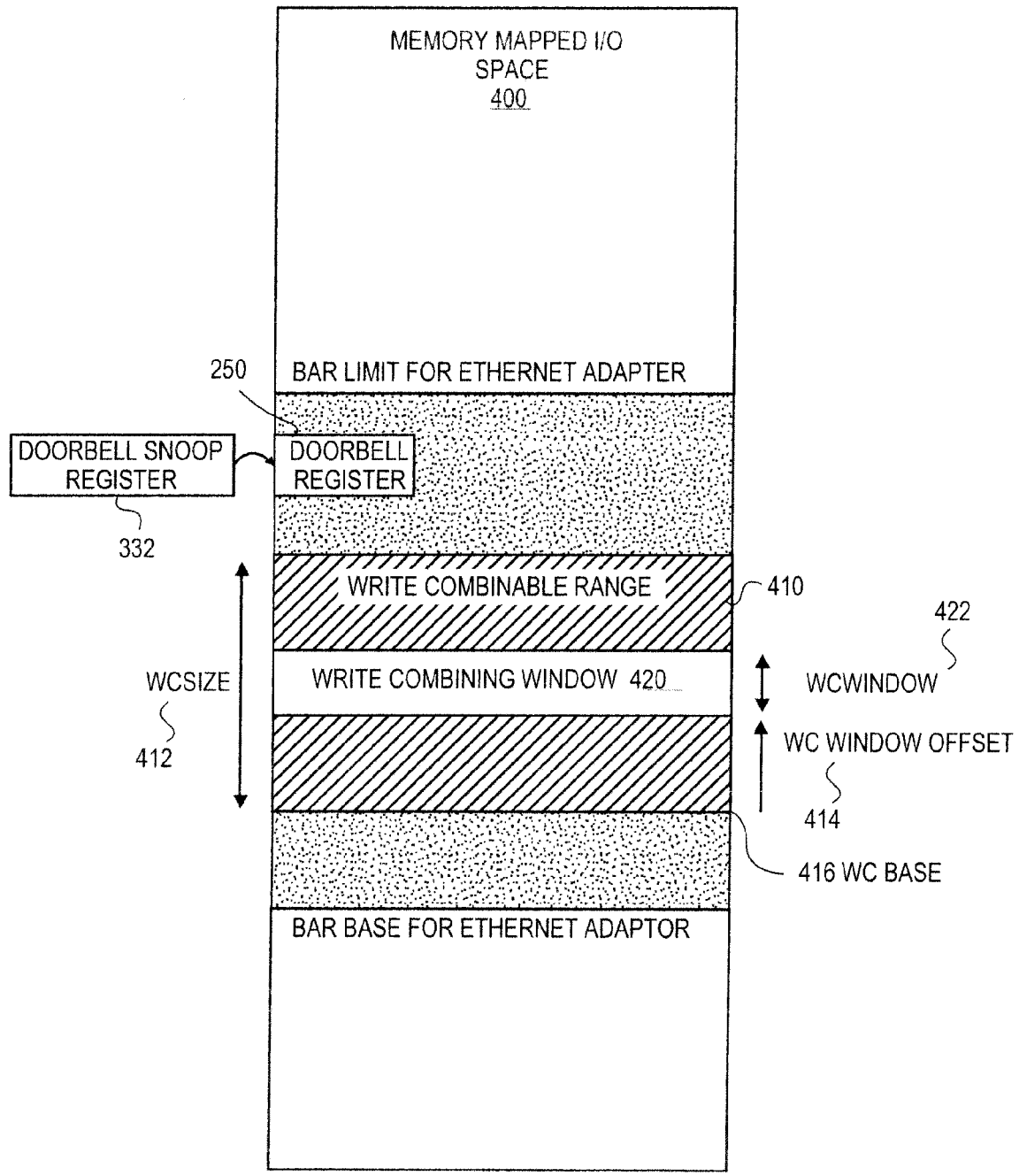
FIG. 3 depicts a block diagram illustrating write-combining of the memory mapped I/O space, in accordance with the further embodiment of the present invention.

For example, as illustrated with reference to FIG. 3, memory mapped I/O space 400 includes an area of physical memory mapped to an I/O device. Within this area, a write-combinable range 410 is defined according to the values contained within the WCBASE 322 and WCSIZE 324 registers (416 and 412). Within the write-combinable range 410, write-combining window 420 is defined by the contents of WCWINDOW register 328. Write combining window 420 represent a contiguous address space within the write-combination range. In one embodiment, write combining window 420 is established by the first write operation that falls within the write-combination range and is aligned to cache line boundaries. Subsequent partial write operations associated with the WC window are coalesced. Window 420 is re-established during subsequent write operations that fall within the write-contribution range 410, but fall outside write-combining window 420. This causes a flush of the contents of the previously accumulated write-combining window 420. As further illustrated, in one embodiment the chipset 200 assigns a value for WCWINDOW offset 414.

Referring again to FIG. 2, the write-combining window logic 300 utilizes WC buffer control logic 360. The WC buffer control logic 360 includes multiple WC buffers 362 (362-1 . . . 362-N). In addition, in the embodiment depicted, logic 360 includes WC flush logic 330. In one embodiment, a one-to-one correspondence is provided between each write-combinable range 410, as illustrated in FIG. 3, to each write-combining buffer 362. In other words, for each write-combinable range defined within the I/O space 400, a corresponding WC buffer 362 will be assigned to store or write-combine write data directed to the corresponding I/O device.

As such, in one embodiment, WC window logic 310 receives an outbound I/O device write. For example, in one embodiment, processor 101 or 102 may desire to write data to an I/O device. Accordingly, for example, MCH 210 would intercept the write transaction request as outbound write 302. Once intercepted, the WC window logic 310 would determine whether an address associated with the write transaction falls within the write-combinable address range 410 (FIG. 3). When such is the case, a corresponding write-combining window within the write-combinable range is determined for the write transaction. Once determined, the data is stored in the corresponding WC buffer 362.

In addition, write-combining logic 300 further includes WC flush logic 330 within control logic 360. In an alternative embodiment, WC flush logic 330 is separate from WC control logic 360. WC flush logic 330 includes multiple doorbell snoop registers 332 (332-1, . . . , 332-N). In one embodiment, there is one doorbell snooping register for each write combining window is implemented by chipset 200. In one embodiment, the various doorbell snoop registers are used to detect a flush request of a respective WC buffer 362 received from, for example, I/O device driver software. For example, in one embodiment, as illustrated in FIG. 1, each I/O device coupled to PCI Express Interface 280 includes one (or more) doorbell registers 250 (250-1, . . . , 250-N). In one embodiment, the same is true of one or more of I/O devices $240_{1-N}$. This allows software to have an explicit and efficient mechanism to flush out only a specific window. As a result, the I/O device driver software is able to direct flushing of a WC 362 buffer by performing a write operation to a doorbell register 250 of the I/O device.

In one embodiment, detection of such a write is performed utilizing doorbell snoop register 332 (332-1, . . . , 332-N). In this embodiment, the doorbell snoop register 332 contains a value that is utilized to identify a device driver write operation to one of the doorbell registers 250 of the respective I/O device. Accordingly, when such a write is detected, WC flush logic 330 determines a corresponding WC buffer 362 assigned to the I/O device doorbell register 250. Once determined, the WC buffer data is flushed to the corresponding I/O device. Furthermore, the WC flush logic 330 is responsible for monitoring contents of the WC buffers 362 in order to maintain compliance with the respective I/O protocol data ordering rules.

For example, in one embodiment, the WC buffers 362 are generally flushed out in a linearly increasing order. In such an embodiment, this guarantee implies that device driver software can make certain ordering assumptions and optimizations. However, with certain protocols such as, for example, the PCI Express protocol, certain conditions may require flushing of the write-combining buffers 362. For example, all windows on a given port are flushed if an outbound write targets a PCI Express port but falls outside all implemented write-combinable ranges and does not match any doorbell registers.

Furthermore, in one embodiment, an inbound read completion flushes out all write-combining windows in order to comply with PCI ordering rules. In addition, an outbound non-posted request which targets the same PCI Express port requires flushing of the various WC buffers 362. Collectively, these events are referred to herein as I/O port flush conditions. Accordingly, in one embodiment, a write-combining control (WCCTL) register 340 is provided. Within the register 340, various control bits are provided to determine whether to override the various I/O port flush conditions described above. Consequently, I/O device driver software is able to comply with the various program order write conditions by using the various doorbell registers to direct flushing of the WC buffers 362, as needed.

In one embodiment, chipset 200 snoops outbound writes to the PCI Express ports of PCI Express Interface 280 coupled to TOE 281 (or any ports supporting the write-combining described herein). If the address of a write transaction matches the value in a doorbell snoop register, the write is temporarily held. All updated bytes in the window associated with the doorbell register is flushed. Finally, chipset 200 allows the doorbell write transaction to proceed.

Figure 4:
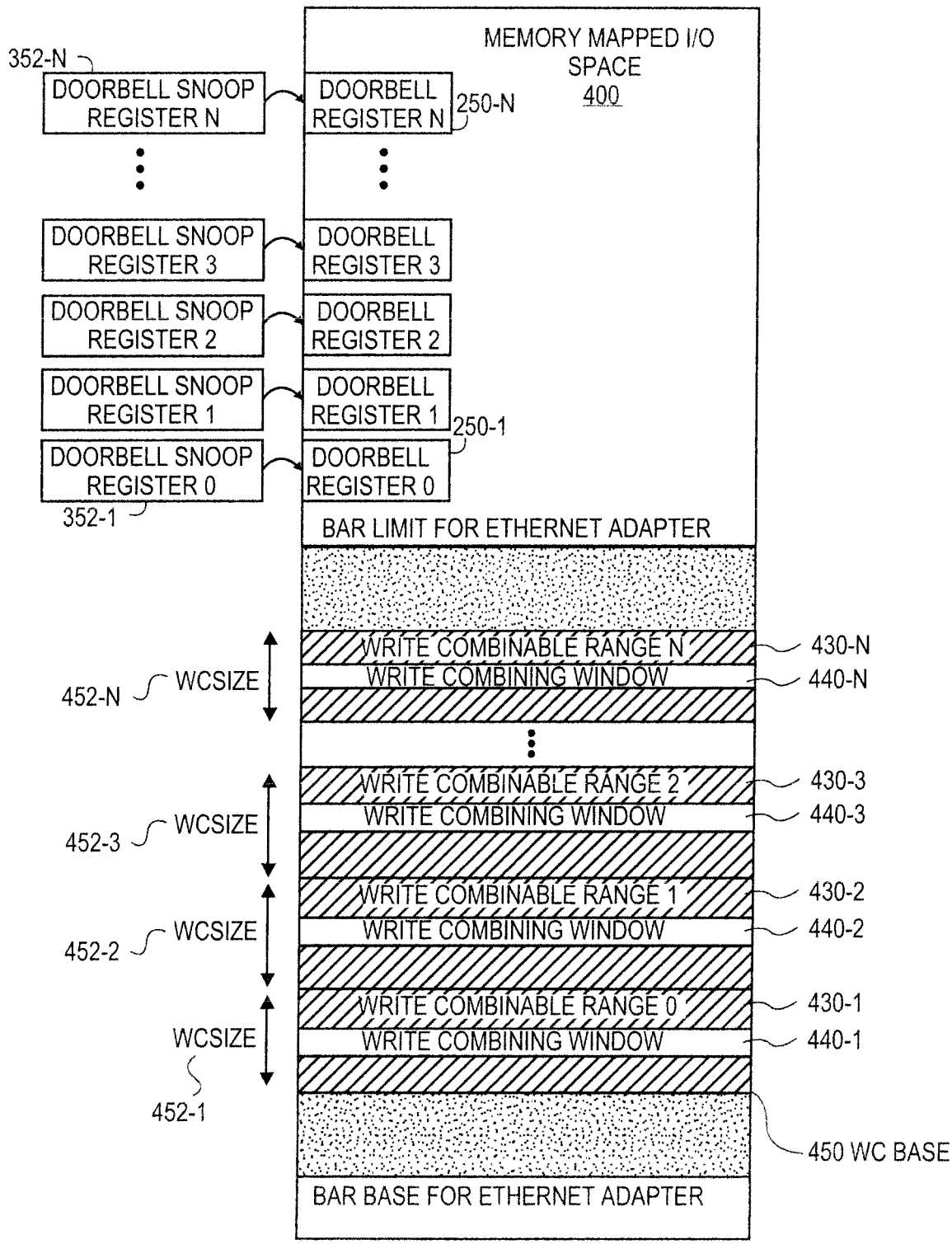
FIG. 4 depicts a block diagram illustrating write-combining with memory mapped I/O space including a plurality of write-combinable ranges, in accordance with a further embodiment of the present invention.

In one embodiment, overriding of the various I/O port flush conditions is determined prior to device startup utilizing the I/O device driver software, which sets control bits within WCCTL register 340. Accordingly, based on the contents of the various WCREGS 320 and WCCTL 340, the I/O write-combining logic 300 is directed to write-combining data of write transaction requests directed to the various I/O devices. Furthermore, as illustrated with reference to FIG. 4, multiple write-combinable ranges may be established within the memory mapped to the I/O device.

In one embodiment, the chipset may implement up to 256 write-combinable ranges as specified by WCNUM 326. In one embodiment, a device driver associated with the respective I/O device is responsible for updating WCREGS 320 in order to define the write-combinable range(s), as well as the write-combining windows and associated write-combining buffers which will be utilized by the chipset 200.

Figure 5:
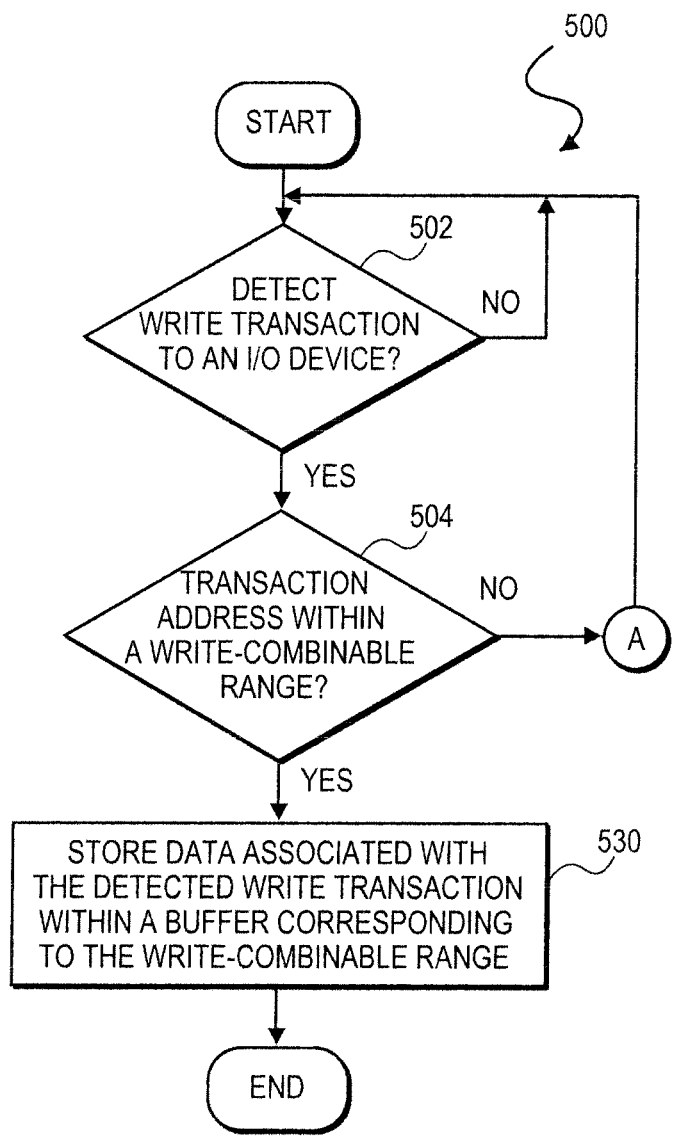
FIG. 5 depicts a flow chart illustrating a method for write-combining data of write transactions directed to an I/O device, in accordance with one embodiment of the present invention.

FIG. 5 is a flow chart illustrating a method 500 for write-combining data of write transactions directed to an I/O device, in accordance with one embodiment of the present invention, which is referred to herein as outbound I/O write-combining. In one embodiment, the outbound I/O write-combining is performed within, for example, a chipset such as depicted with reference to FIG. 1. In another embodiment, the outbound I/O write-combining may be performed within a memory controller hub portion of a chipset, for example, as depicted with reference to FIG. 1.

Referring again to FIG. 5, at process block 502 it is determined whether a write-transaction request is directed to an I/O (input/output) device (e.g., a TOE adapter, an Ethernet adapter, etc.). For example, as depicted with reference to FIG. 1, processor 101 or 102 may desire to write data to I/O device via the PCI Express Interface 280. Accordingly, the write transaction request could be intercepted by, for example, MCH 210. As such, when the write transaction is directed to an I/O device, the write transaction may be provided to outbound I/O write-combine logic 300.

Figure 6:
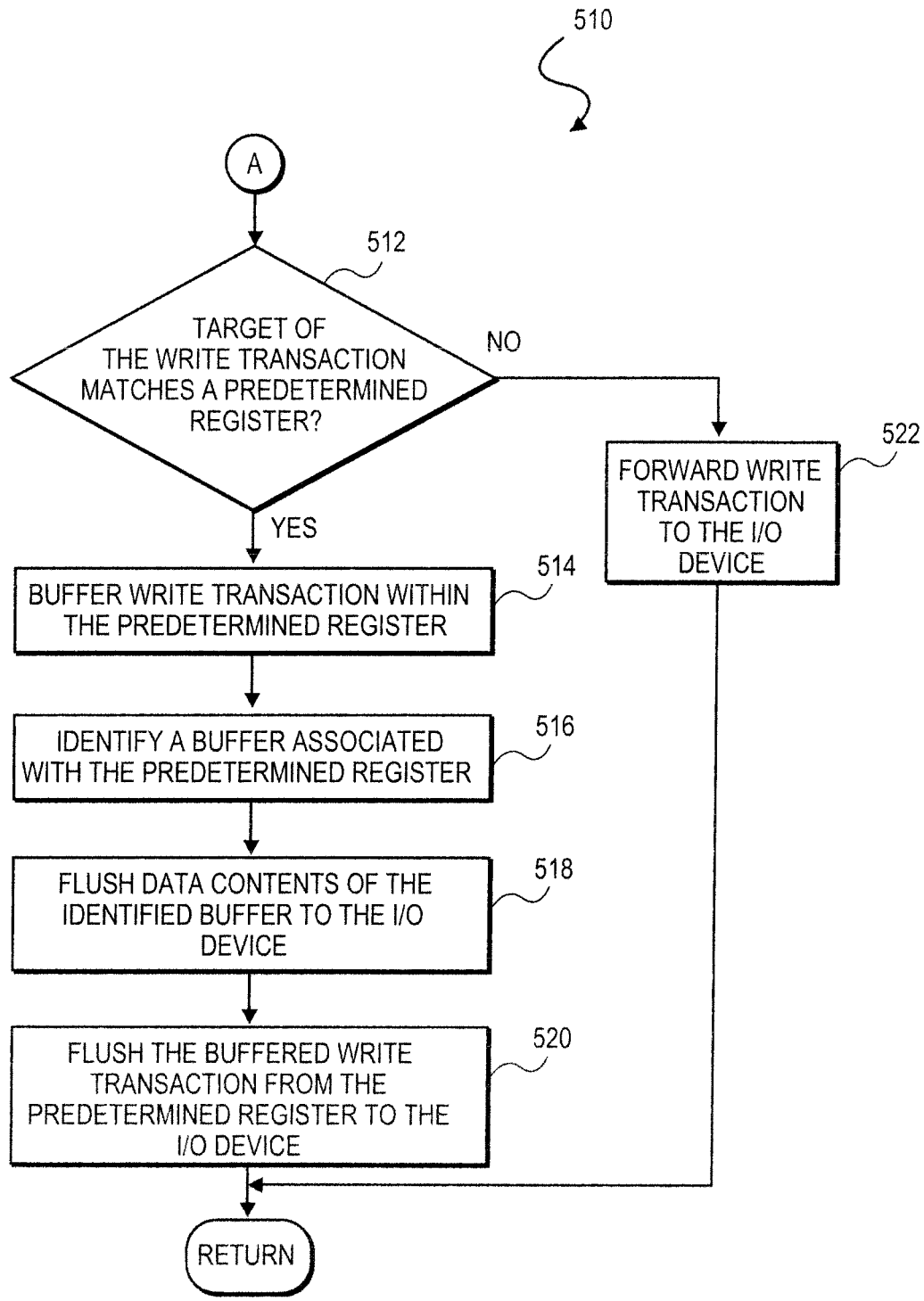
FIG. 6 depicts a flow chart illustrating a method for detecting a request to flush a write-combining buffer and performing the requested flushing, in accordance with one embodiment of the present invention.

At process block 504 it is determined whether the transaction address falls within a write-combinable range. In one embodiment, the write-combinable range is predefined within a memory mapped I/O space assigned to the respective I/O device. As such, when the transaction address falls within a write-combinable range, at process block 530, data associated with the detected write transaction is stored within a write-combining (WC) buffer assigned to the write-combinable range; otherwise, control flow branches to flow diagram (510), as shown in FIG. 6. In doing so, one embodiment enables burst performance of write transactions directed to I/O devices.

FIG. 6 is a flow chart illustrating a process 510 for detecting a WC buffer flush request, in accordance with one embodiment of the present invention. At process block 512, it is determined whether a target (transaction address) of a write transaction matches a predetermined register. In one embodiment, the predetermined register refers to, for example, a doorbell register of an I/O device assigned according to device driver software (see FIGS. 1 and 2). In addition, the transaction address refers to a portion of the memory mapped I/O assigned to the register.

According to this embodiment, the I/O device driver software updates one or more chipset registers with values to identify the I/O device doorbell registers (mapped I/O address). As such, when a match is detected, at process block 514, the write transaction is buffered within a doorbell (predetermined) register. At process block 516, a WC buffer associated with the predetermined register is identified. In this embodiment, the I/O device driver software directs, for example, the chipset to assign a respective WC buffer to each I/O device doorbell snoop register (and corresponding doorbell register). Next, at process block 518, data contents of the identified WC buffer are flushed to the corresponding I/O device. Once flushed, at process block 520, the buffered write transaction is flushed from the predetermined register to the I/O device.

Figure 7:
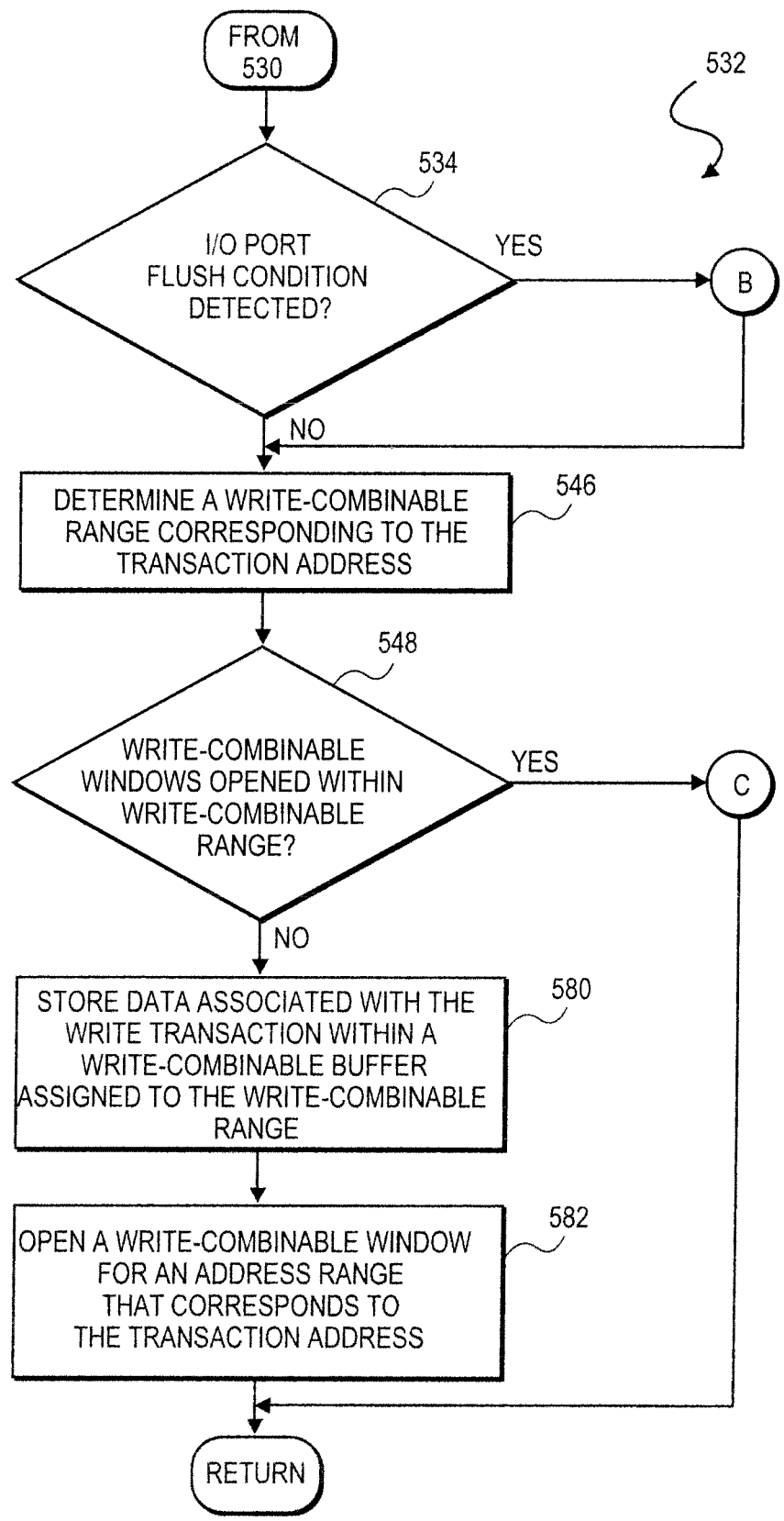
FIG. 7 depicts a flow chart illustrating an additional method for write-combining transaction data within a write-combining buffer, in accordance with a further embodiment of the present invention.

FIG. 7 is a flow chart illustrating a process 532 for combining I/O writes in accordance with a further embodiment of the present invention. At process block 534 it is determined whether an I/O port flush condition is detected. In one embodiment, the I/O port flush conditions are detected and determined, according to data ordering rules prescribed by the I/O protocol governing attached I/O devices, such as, for example, PCI Express, or the like. Once the I/O port flush condition is resolved, process block 546 is performed.

At process block 546, a write-combinable range corresponding to a transaction address is identified. At process block 548 it is determined whether a write-combining window, assigned to the identified write-combinable range is open. When all windows within the identified write-combinable range are closed, process block 580, is performed. Otherwise, control flow branches to block C of FIG. 9. At process block 580 data associated with the write transaction is stored within a WC buffer assigned to the write-combinable range. At process block 572, a write combining window is opened for an address range of the identified write-combinable range that corresponds to the transaction address.

Figure 8:
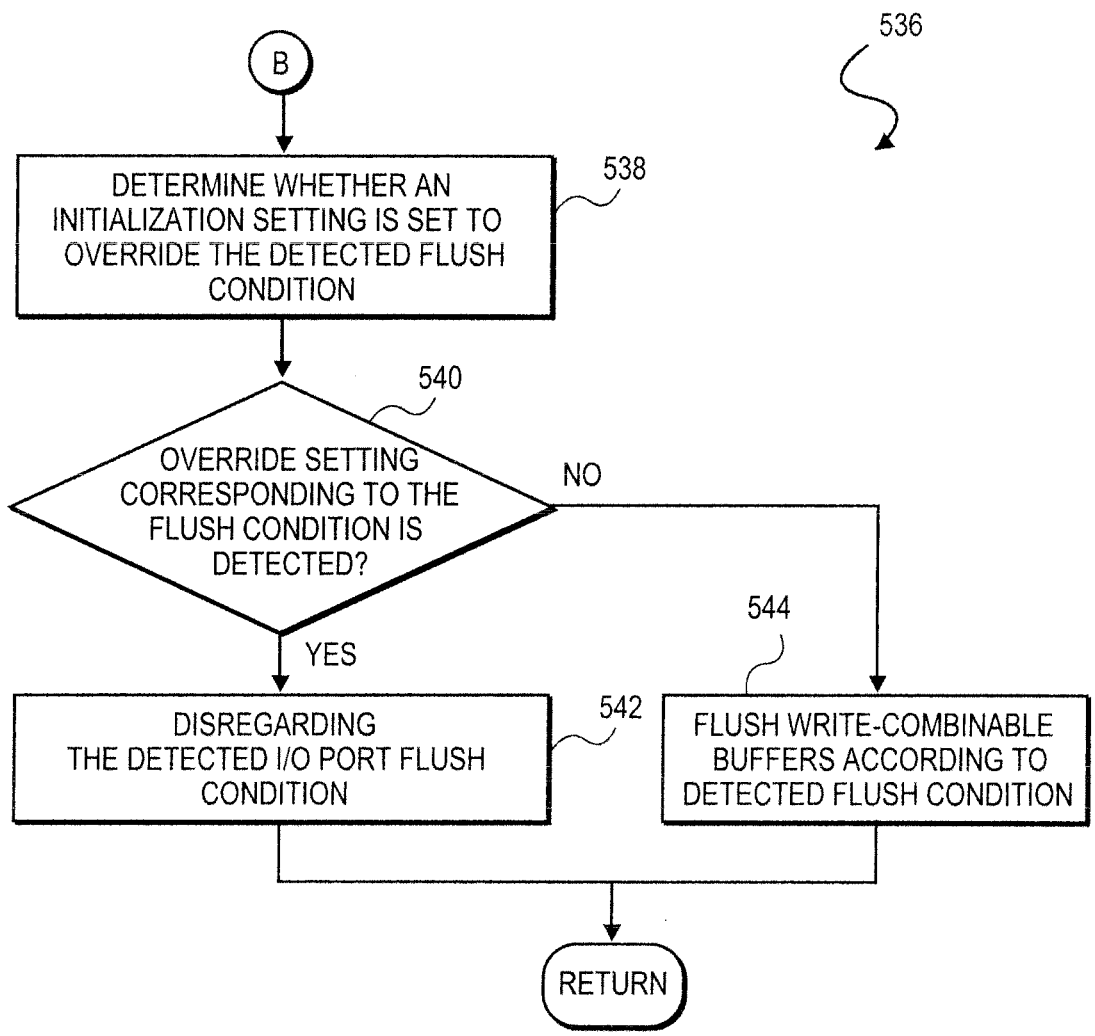
FIG. 8 depicts a flow chart illustrating a method for over-riding detected I/O port flush conditions in accordance with detected configuration settings, in accordance with a further embodiment of the present invention.

FIG. 8 is a flow chart illustrating a process 536 performed when an I/O port flush condition is detected, in accordance with one embodiment of the present invention. When an I/O port flush condition is detected, at process block 538, it is determined whether an initialization setting is set to override the detected I/O port flush condition. When such a setting is detected, at process block 540, the detected I/O port flush condition is disregarded at process block 542. Otherwise, at process block 544, one or more WC buffers are flushed according to the detected I/O port flush condition.

Figure 9:
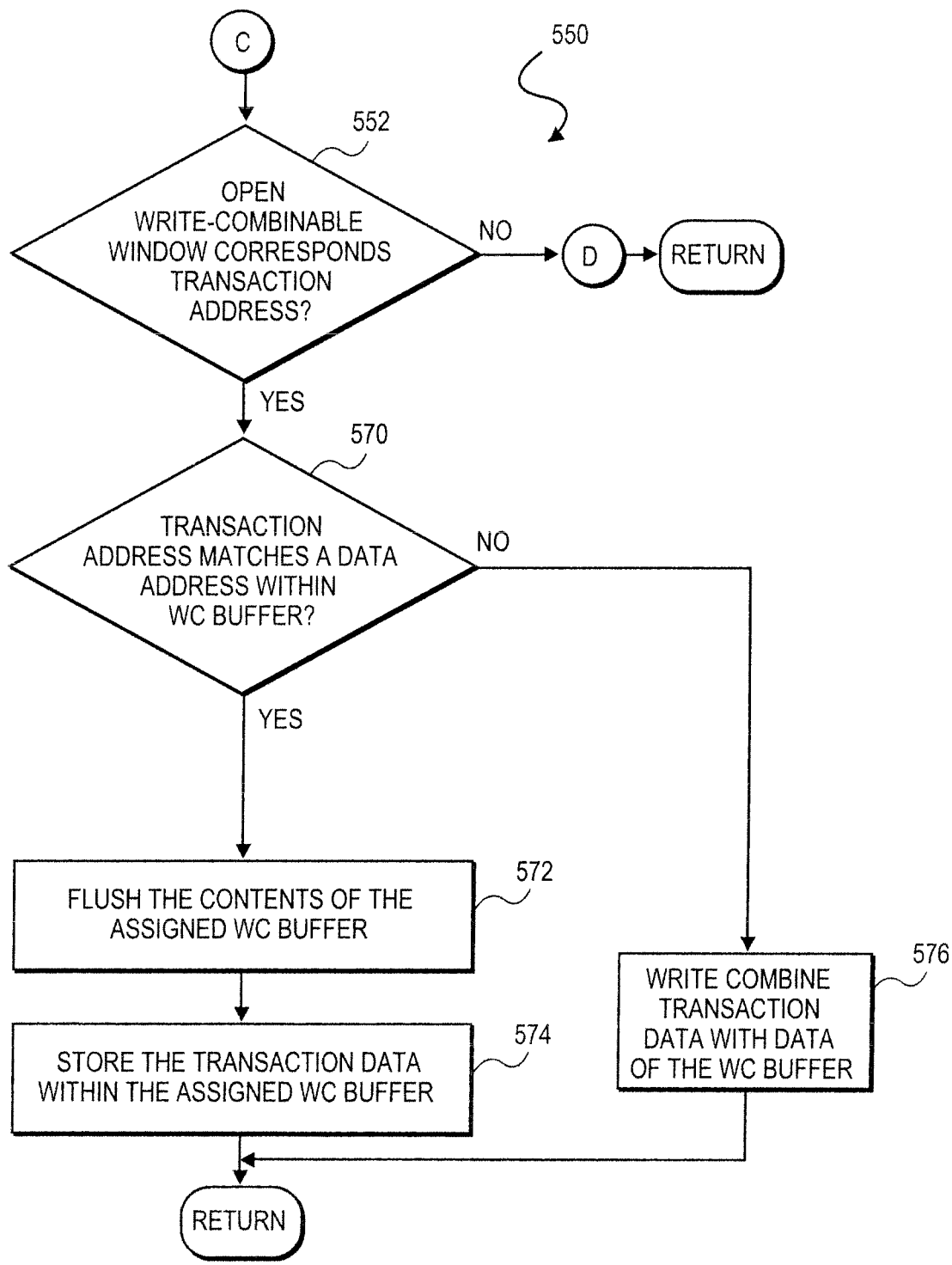
FIG. 9 depicts a flow chart illustrating a method for storing data within a write-combining buffer when a write-combining window is open within a write-combinable range, in accordance with a further embodiment of the present invention.

FIG. 9 is a flow chart illustrating a process 540 for outbound I/O write-combining when an open WC window is detected, in accordance with a further embodiment of the present invention. At process block 552 it is determined whether an address range associated with the open WC window corresponds to the transaction address of the detected write transaction. When correspondence is detected, at process block 570, it is determined whether a data address within the assigned WC buffer corresponds to the transaction address. When such a condition is detected, process block 572 is performed; otherwise, at process block 576, the transaction data is write-combined with data contained within the assigned WC buffer. At process block 572, contents of the assigned WC buffer are flushed to a corresponding I/O device. Once flushed, the transaction data is stored within the assigned WC buffer at process block 574.

Figure 10:
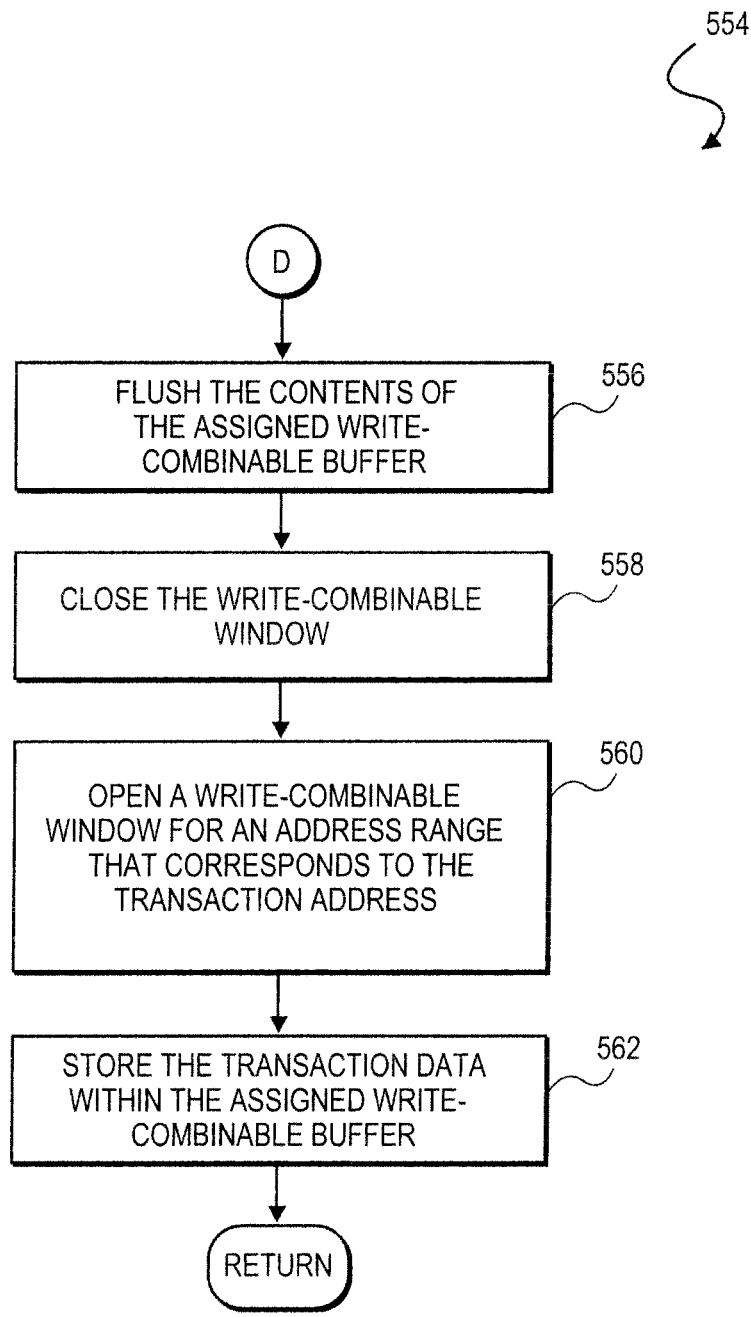
FIG. 10 depicts a flow chart illustrating a method for storing transaction data within a write-combining buffer when all write-combining windows within a write-combining area are closed, in accordance with a further embodiment of the present invention.

FIG. 10 is a flow chart illustrating a process 554 for performing I/O write-combining when an open WC window is detected, in accordance with a further embodiment of the present invention. When correspondence is not detected at process block 552 (FIG. 9), process block 556 is performed. At process block 556 the contents of the assigned write-combining buffer are flushed to a corresponding I/O device. Once flushed, at process block 558, the open write-combining window is closed. At process block 560, a write-combining window is opened for an address range that corresponds to the transaction address. Once opened at process block 562, the transaction data is stored within the write-combining buffer assigned to the identified write-combinable range.

Accordingly, as illustrated with reference to FIGS. 8-10, one embodiment of the present invention opens and closes write-combining windows within the designated write-combinable ranges, according to the transaction address of write transactions directed to I/O devices. According to this embodiment, when an open write-combining window address range corresponds to a transaction address, data is stored within the assigned WC buffer, unless overlapping data is detected. When overlapping data is detected, the contents of the assigned buffer are flushed. Subsequently, the new transaction data is stored in the assigned buffer.

Otherwise, when a write-combining window is not opened within the write-combinable range, a write-combining window is opened within an address range that corresponds to the transaction address of the detected write transaction request. In other words, depending on the transaction address, a write-combining window is opened such that the transaction address falls within an address range assigned to the write-combining window. In one embodiment, the address range of the window is based on a size specified within WCWINDOW register 328, as depicted in FIG. 2.

As illustrated above, in one embodiment, flow diagrams shown in FIGS. 5-10 describe methods according to embodiments of the present invention for outbound I/O write-combining within, for example, a system chipset or memory controller hub (MCH) of the computer system. However, in one embodiment, software, such as, for example, an I/O device driver is required to initialize one or more write-combining configuration registers of the chipset MCH or the like. For example, as depicted with reference to FIG. 2, in one embodiment, WCREG 320 may be loaded with values that govern outbound I/O write-combining.

An Exemplary Implementation

In one embodiment, write combining logic 300 is limited to compliant PCI Express ports between a PCI Express Interface 280 and MCH 210 (e.g., 2 ports) that track and decode MMIO address range that target the Ethernet Adapter's base address, where the ranges are defined using WCBASE register 322, WCNUM register 326, and WCSIZE register 324 in the PCI Express configuration register space. In such an embodiment, computer system 100 performs an Ethernet controller push model with chipset write combining to directly place data to the target device. The process begins with a write operation made by processors 101 or 102 to its own write combining buffer. These write combining buffers are typically one cache line long (e.g., 64 bytes). At some point in the future, there is a partial write combining buffer eviction from the processor. Flushing of the write combining buffer of the processor may occur because of a interrupt or a context switch, for example. In one embodiment, there are no remote snoops required due to non-coherent memory shared between processors. The evicted line from the write combining buffer the processor is received by chipset write combining logic 300. Chipset write combining logic 300 tries to coalesce by write combining the various writes received from CPUs into one PCI-Express transaction. In one embodiment, chipset 200 combining logic 300 tries to put them into 128 byte buffers, which is the size of the write-combining window (per range). In such a case, the descriptor and pay loads are packaged into one large outbound write from chipset 200. At the same time, the MMIO receives a notification of the new descriptor. Thus, chipset write combining logic 300 reduces the overhead involved with Ethernet device transmits (e.g., when the Ethernet device sends a packet) by pushing descriptors directly into the MMIO space of TOE adaptor 281 and avoiding the long round trip descriptor latency that is significant for high speed multi-Gigabit Ethernet devices. In this push model, the device driver issues a large descriptor write to the NIC. Subsequently, a UC write to the Ethernet signals the end of the write combining operation.

Ordering and Flushing Rules

In one embodiment, chipset write combining logic 300 coalesces the write operations that fall within the decoded WC range into one of its WC buffers for a given port until a flushing event occurs. In one embodiment, the following flushing writes cause the flushing of a WC buffer. When all bytes within a specific window have been written, WC flush logic 300 flushes the bytes in the window onto PCI Express interface 280. If the write combining window flush bit is set (such as by, for example, software), then WC flush logic 300 flushes all write combining buffers out to PCI Express interface 280. This may be used to perform a software triggered flush. Note that the flush bit(s) may be stored in configuration space registers (CSRs) for the PCI Express port(s). When a write operation whose address matches the contents of one of doorbell snoop registers 352-1 to 352-N, WC flush logic 300 flushes the window paired up with that snooping register and subsequently, the doorbell write operation flows through to PCI Express interface 280. When a new outbound write operation occurs to an address within a write combinable region that falls outside the previously established window, WC flush logic 300 flushes the old window and establishes a new window. The new write operation is held by chipset 200 until a subsequent flushing action.

In one embodiment, when any of the above rules occur, chipset 200 writes the appropriate buffer or buffers out to PCI Express interface 280 starting with the address pointed to by the first cache line aligned address and up to the maximum length possible. If a flushing event occurs and not all bytes have been updated, then chipset 200 breaks the write into multiple, smaller but maximal length packets (as described below) on the PCI Express bus to ensure that only the written bytes are flushed (in increasing address order). In this embodiment, the WC buffers get flushed in linear addressing order starting with the written location at the lowest address and only the bytes written by the processor are flushed.

In one embodiment, chipset logic 200 will not flush the WC buffer when the following events occur. An outbound write that falls outside all implemented write combinable regions and does not match the address of any doorbell snoop registers does not cause any flushing. An inbound read completion returning to a port does not cause flushing of write combining windows. Any other outbound non-posted request that falls outside of all implemented write combinable regions does not cause flushing of write combining windows. If processors 101 and 102 or another I/O device reads a location within a WC region, it is not guaranteed to be coherent because chipset 200 passes the read to the device without any impact on the WC buffer. Further, an outbound message does not cause flushing of write combining windows. In one embodiment, chipset 200 will not flush the WC windows when it receives an outbound write operation to an address in an established window that over-writes a location already modified, i.e. it collapses the new data on top of the old data without flushing.

Byte Tracking Mechanism

In one embodiment, all PCI-Express transactions have a first and last DW byte enable associated with the request header. Write combining logic 300 in chipset 200 tracks the byte enables of all transactions that fall within the write combining range. A byte enable vector (PORTx_BE_VECT [511:0]; x={2, 3}) is maintained within the WC logic 300 for each of the ports through TOE adapter 281.

PORTx_BE_VECT[127:000]—Byte enable vector for WC window 0

PORTx_BE_VECT[255:128]—Byte enable vector for WC window 1

PORTx_BE_VECT[383:256]—Byte enable vector for WC window 2

PORTx_BE_VECT[511:384]—Byte enable vector for WC window 3

In one embodiment, PORTx is the first two upper ports coupling MCH 210 and PCI-Express Interface 280.

The byte enable array is updated upon receipt of a new request that falls within the write combining range and its corresponding write combining window. The byte enable vector for a write-combining window is used to determine the Maximum Length PCI-Express Packet (MLP), described below, that can be sent out on the port during the flushing of a window.

In one embodiment, the device drivers write to the write combining window in double word (DW) granularity with valid byte enables (4'hf). In such a case, to flush a write-combining window, a single bit is used for each DW location that is written in the write-combining window. This translates to a 32 bit vector for each write-combining window, instead of a 128 bit byte enable vector for each write-combining window.

Selective Blocking Mechanism for Improving Link Bandwidth

Figure 11:
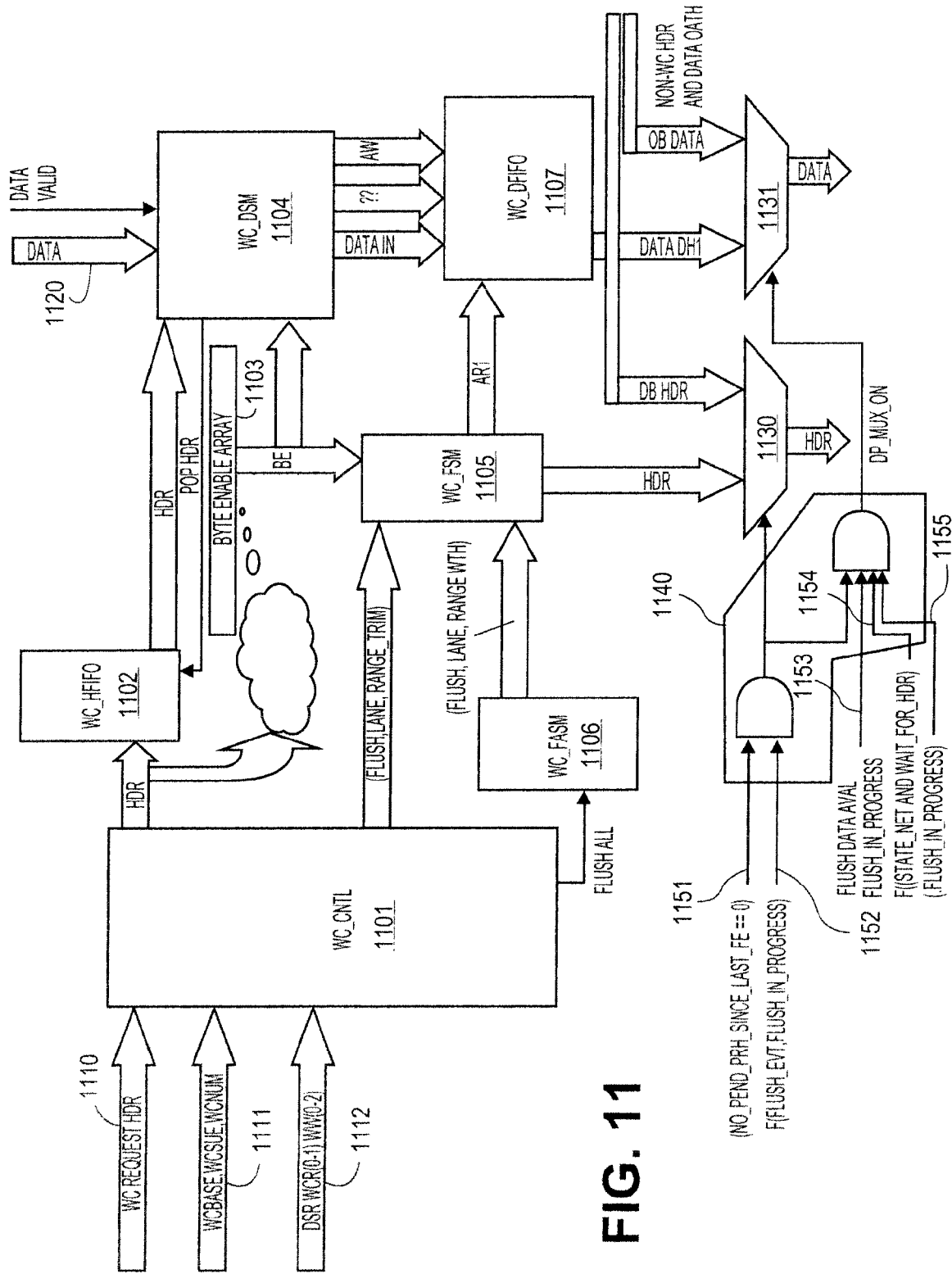
FIG. 11 illustrates one embodiment of an outbound data path.

In one embodiment, the transaction layer in write-combining logic 300 provides a separate data path for distinguishing write combining transactions from non-write combining (non-WC) transactions for PCI-Express ports. Towards this end, separate header and data first-in/first-out (FIFO) are implemented, along with the WC logic, in an outbound transaction layer unit for WC transactions and non-WC PCI-Express transactions. FIG. 11 illustrates one embodiment of an outbound data path. Referring to FIG. 11, write-combining (WC) control unit 1101 receives the write-combining request header 1110, WC base, WC size, WC num 1111, along with DSR_DCR(CR-1)_WIN(0-3) 1112. WC control unit 1101 looks at the transaction and sees what action should be performed. For example, WC control unit 1101 may determine whether it falls within a window and determine which write-combining window. WC control unit 1101 updates the byte enable vector table. Thus, each transaction comes in and it is checked to determine if it is a write-combining transaction. If WC control unit 1101 determines the write-combining transaction, it pushes the header into the header FIFO 1102 and the data is used to update the byte enable array 1103. WC_DSM 1104 is a data state machine that generates the control signals that store data to and read data from data FIFO 1107. In one embodiment, the control signal is a read/write control signal. The data 1120 from a WC transaction goes into the data FIFO 1107 under control of WC_DSM 1104.

If WC control unit 1101 determines a flush is to be performed, it signals the flush state machine 1105, which flushes individual window or a flush all state machine, which sub-control signals to flush state machine 1105 to cause all windows to be flushed. Thus, flush state machine 1105 in flush all state machine 1106 issues control signals to flush one or more windows. The header along with the data or output from flush state machine 1105 and data FIFO 1107 respectively to multiplexer 1130 and 1131, respectively. Non-write-combining headers and data are also input to muxes 1130 and 1131, respectively.

Output control logic 1140 selects the header and data output from muxes 1110 and 1111. In one embodiment, output control logic 1140 includes a pair of AND gates that receive selected signals described herein. Control signal 1151 indicates the number of pending transactions since the last flushing event equals zero when asserted. When asserted, control signal 1152 indicates that the start of a flushing event has occurred. Control signal 1153 indicates that the flush data is available when asserted (e.g. data is available in the data FIFO). When asserted, control signal 1154 indicates that a flushing event has happened and control signal 1155 indicates that the state machine is in the correct state to have the write combining data output.

In one embodiment, the MCH includes a Coherency Engine (CE), core (processor) interface logic and a PCI Express unit. When a processor issues a request, the CE decodes the request and determines whether the transaction (e.g., request) belongs to the PCI Express unit. Thus, the CE determines where the transaction should be sent. In one embodiment, the CE also identifies the port number to which the transaction is to be directed in the PCI Express Interface. The request information is essentially stored in the PCI Express unit in the header (HDR) FIFO. The core interface logic performs the data fetch operation in response to the header information. That is, the core interface logic uses the information in the request to go to the data management buffers (e.g., FIFO) to fetch the data and send it to the PCI Express unit.

The CE and the core (processor) interface logic within the PCI-Express unit provide header/data information to the FIFOs in the transaction layer. In one embodiment, a flow control mechanism prevents the FIFOs from overflowing, while implementing selective blocking. The selective blocking may improve the effective utilization of PCI-Express bandwidth for robust system performance.

Output control logic 1141 controls muxes 1130 and 1131 to implement the selective blocking mechanism. In one embodiment, the flow control mechanism in PCI-Express logic of chipset 200 is implemented on a per port basis for Posted (P) and Non-Posted (NP) flow class. Completion (CPL) flow class have infinite credits, in that, they have a proactive flow control mechanism. This ensures that a CPL request on a port are never sent when FIFO resources for the CPL class are unavailable or inadequate for that port. In one embodiment, posted transaction flow control mechanism occurs on ports 2 and 3, since all WC transactions are posted transactions.

In one embodiment, flow control to PCI-Express ports 2 and 3 posted PCI-Express transactions could occur either due to resource (FIFO Full conditions) unavailability or due to WC window flush in progress on the port. The blocking mechanism blocks transactions due to a WC window flush being in progress on a port to ensure that multiple pending flushes on a port do not occur at the same time. By blocking only posted request on the flushing port, without blocking non-posted and CPL on the same port, chipset 200 improves PCI-Express performance. The block on the posted transactions on the port is released when the flush is complete.

In one embodiment, the coherency engine defers all WC transactions on the bus between frames 101 and 102 and MCH 210 and it can send the posted data in any order to a non blocking port, i.e. when a WC flush happens on port 2 and the 10 cluster blocks the posted requests on port 2 from the coherency engine, the coherency engine can still send posted data to the other WC port using port 3. In this way, the data can be interleaved across ports without impeding the processor bus or other interfaces. The only exception to this flow control behavior occurs during flushing action due to a write to an address written the WC range that falls outside of a previously established window, when port 3 gets blocked temporarily to allow port 2 to re-establish its new WC window within its write-combining range. This restriction is due to the implementation of common control path logic in one embodiment of chipset 200 for the individual RAMs for WC ports 2 and 3 to optimize die-area constraints. However, there are no architectural constraints that limit the implementation to concurrent data processing for the two WC ports. Such an implementation would allow the removal of the temporary block on the other WC port mentioned above.

Figure 12:
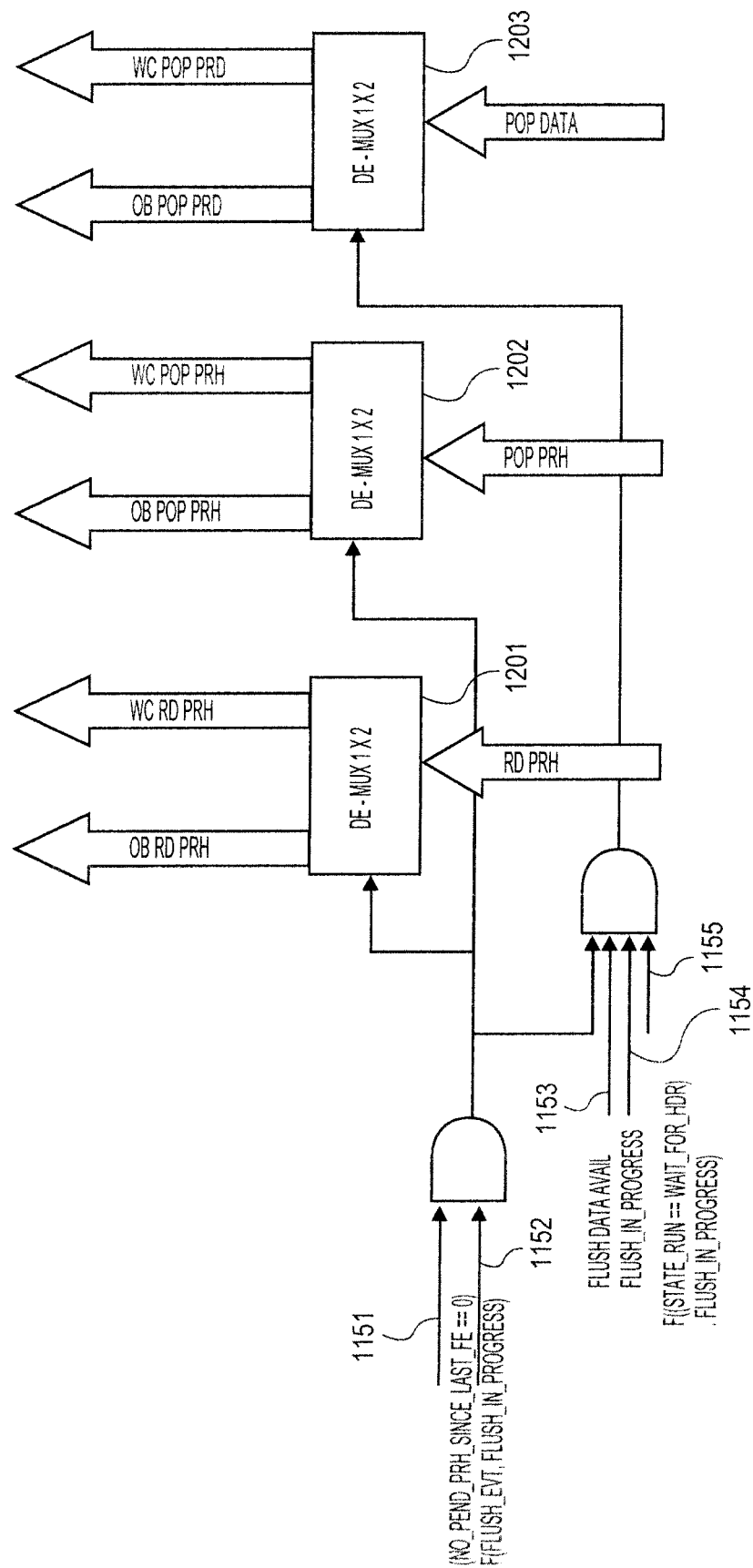
FIG. 12 illustrates the control path for the outbound posted transaction.

The control path for the outbound posted transaction is illustrated in FIG. 12. Downstream logic issues a read operation to the upstream buffers and then determines that the read operation should go to the write combining group or the non-write combining group. This occurs in the logic of MCH 210 in chipset 200. When a read operation is issued to read the data associated with either the data from the write-combining or non-write-combining FIFOs, the logic in FIG. 12 is used to insure the write data is output. Referring to FIG. 12, three 1×2 de-muxes 1201-1203 are used to output information. Demux 1201 receives the posted read header (PRH) of a read operation and outputs either an outbound (OB) read header or a write-combining read header based on control signals from control logic 1140. Demux 1202 receives a posted operation (POP) PRH and outputs either in outbound POP PRH or write combining POP PRH based on control signals from the control logic 1140. Demux 1203 receives a POP data and outputs either an outbound POP posted read data (PRD) or write combining POP PRD in response to the control signals from control logic 1140.

Ordering Rules

In one embodiment, MCH 210 treats the WC window flush as a single atomic WC transaction within the framework of PCI-Express ordering. Since MCH 210 treats flushing of the WC window as a single atomic transaction within the domain of order, the flushing event becomes important in determining the number of non-WC posted pending transactions (waiting in the outbound FIFOs) that were issued before the flushing event. Since posted transactions cannot bypass each other and there is a need to maintain a strict ordering requirement, pending transaction are flushed before the WC window flush occurs.

In one embodiment, MCH 210 uses two counters to implement this ordering requirement, referred to herein as num_prh_PortX_pending and num_prh_PortX_since_last_flushing_event, where X equals the number of the ports between MCH 210 and PCI Express Interface 280. In one embodiment, there is a pair of these counters for each port.

The Num_prh_PortX_pending counter keeps track of the number of pending posted request in the Outbound FIFO for the Port X. When a posted transaction is pushed into the outbound FIFO queue for the port, the counter is incremented. When a posted transaction is dispatched from the outbound FIFO queue for the port, the counter is decremented.

The Num_prh_PortX_since_1st_flushing_event counter stores the current value of Num_prh_PortX_pending for its corresponding port when a flushing eviction event happens on a port. When a posted transaction is dispatched from the outbound FIFO queue for the port, the counter is decremented. When Num_prh_PortX_since_last_flushing_event for the port is zero, after a flushing event (a doorbell snoop flushing event), the control path (FIG. 11) logic switches the data path from the outbound FIFO to the WC window buffers (FIFO structures) and the WC window flush occurs, followed by the DSR write operation.

The following example illustrates the use of these two counters. Consider the following transaction sequence on Port 2 is linear time order—{P1, P2, P3, WC1(WCR0), WC2 (WCR0), P4(DSR2 WR)}, where "P" represents a posted write. This example assumes that both WC posted write operations fall within the same WCW. When a DSR write operation causes, Num_prh_Port2_pending is 2, which means that, P1 has already been dispatched from the outbound FIFO. Hence, Num_prh_Port2_ since_last_flushing_event takes on the value of Num-prh_Port2_pending. The DSR write operation causes the Num_prh_Port2_pending to be incremented to 3. Subsequent dispatches of P2 and P3 from the outbound FIFO causes the values in Num_prh_Port2_since_last_flushing_event counter to be decremented and Num_prh_Port2_pending counter, resulting in Num_prh_Port2_since_last_flushing_event counter being set to 0 and Num_prh_Port2_pending counter being set to 1. Since the value in the Num_prh_Port2_ since_last_flushing_event counter is 0, the WC window flush can proceed followed by the DSR write. Both the Num_prh_Port2_since_last_flushing_event counter and Num_prh_Port2_pending counter reduce to 0 after the DSR write operation is dispatched from the outbound FIFO. The above mechanism maintains ordering by ensuring that P1, P2, P3 are sent in order on the PCI-Express Port 2 followed by the WC flush, which is followed by the DSR write.

Maximal Length Packet Transfer on PCI-Express

In one embodiment, MCH 210 identifies the Maximum Length Packets within the WC window in response to a flushing event, resulting in the least number of PCI-Express packets flushed out on the link from TOE 281. This attempts to ensure optimal utilization of PCI-Express link bandwidth.

In one embodiment, PCI-Express performance (the backbone I/O link that connect chipset 200 to I/O devices) depends considerably on the size of the transaction layer packets (TLP) that is generated from MCH 210 to the target I/O device.

In one embodiment, MCH 210 detects and flushes maximal length packets from a write combining window within chipset 200 to increase PCI-Express link utilization and improve overall system performance in server/workstation chipsets. This enables an I/O device to obtain data through large sized contiguous packets on PCI-Express instead of smaller, disjoint TLPs and this features provides high utilization/throughput.

A mechanism to identify the Maximum Length Packets (MLPs) within the WCW on a flushing event, resulting in the least no of PCI-Express packets flushed out on the PCIs Express link is useful for improved utilization of PCI-Express link bandwidth. The MLP can be defined as a packet of maximum payload that can be formulated within the write-combining window, while adhering to the PCI-Express packet protocol rules.

The PCI-Express protocol has an explicit FIRST_DW_BE (first doubleword bytes enable) and LAST_DW_BE (last double word byte enable) associated with memory, I/O and CFG transaction packet header. In one embodiment, the FIRST_DW_BE [3:0] field contains bytes enables for the first doubleword (DW) of any memory read or write request, and for the only DW of an I/O or configuration request. If there is only one DW for a memory request, this byte enable field is used. If the length field for a request indicates a length of greater than 1 DW, this field is not inactive. The LAST_DW_BE [3:0] field contains byte enables for the last DW of any memory read or write request. If the length field for the request indicates a length of 1 DW, this field is inactive.

The MLP defines a data payload of Maximum Length (e.g., upper bound—128 bytes) that can be formulated with valid first and last DW byte enables as defined above and with all active intermediate DW byte enables implicitly valid.

In one embodiment, a byte enable vector is maintained for each of the WC window. On a flushing event, the byte enable vector for the window is parsed to identify the maximum length packet and its corresponding FIRST_DW_BE and LAST_DW_BE that can be sent out on the PCI-Express link. In one embodiment, the MLP detection mechanism in MCH 210 ensures that a 128 byte write in DW granularity with all valid byte enable of 4'b1111 for all the DW is flushed out on the PCI-Express link as a single PCI-Express packet of payload 128 bytes. This improves overall system performance by improving PCI-Express link bandwidth utilization.

Figure 13:
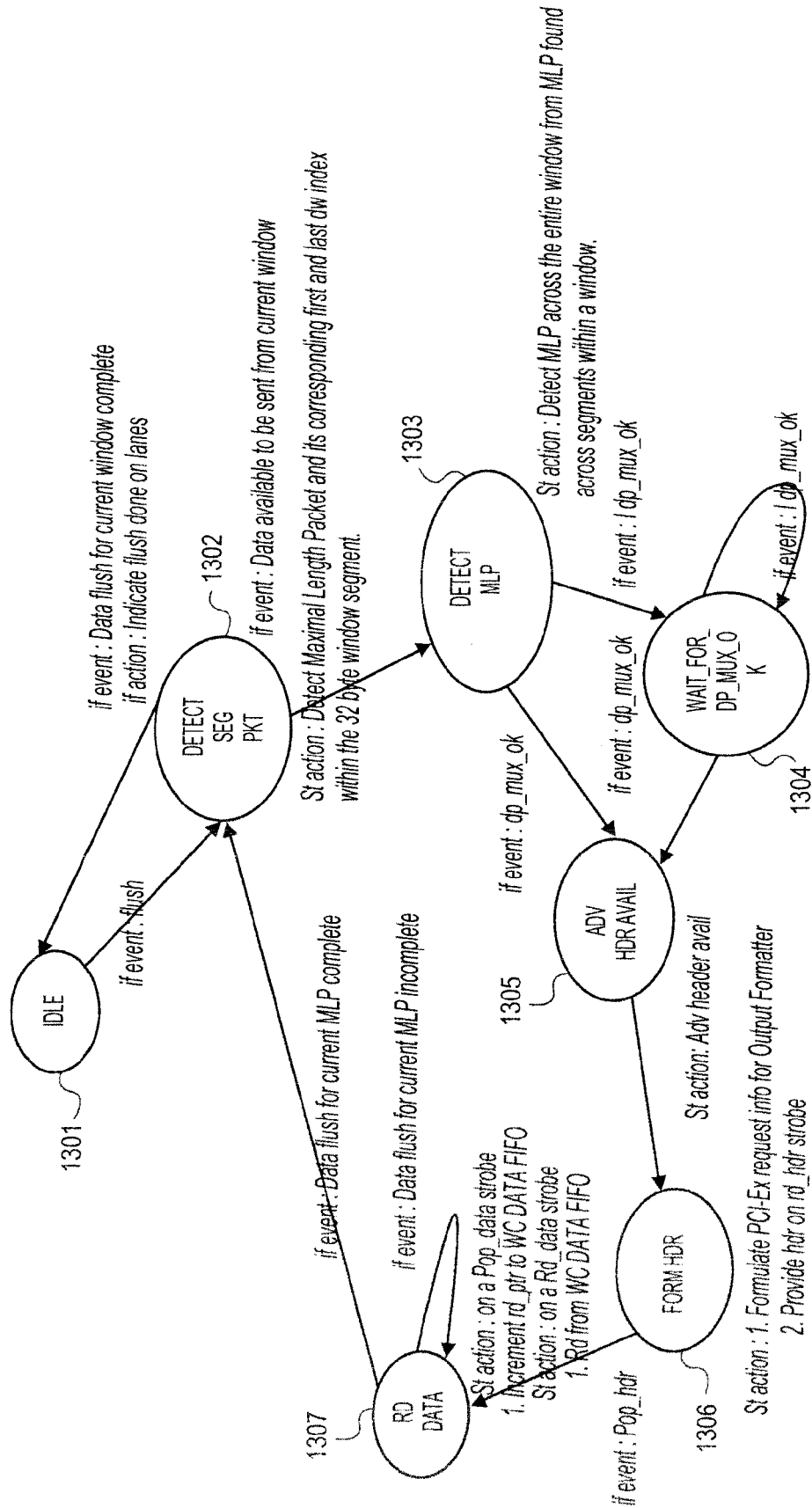
FIG. 13 is one embodiment of an MLP state transaction diagram for detecting all MLPs.

FIG. 13 is one embodiment of an MLP state transaction diagram for detecting all MLPs. Referring to FIG. 13, IDLE state 1301 is the default state of the flush state machine when in the idle state. While in IDLE state 1301, the state machine transitions to DETECT_SEG_PKT state 1302 in response to receiving a flush event. In DETECT_SEG_PKT state 1302, the state machine parses the byte enable vector. While in the DETECT_SEG_PKT state 1302, the state machine transitions to idle state 1301 in response to completing the flush for the current window and indicates that the flush is done on a particular port of a PCI-Express Interface 280. While in the DETECT_SEG_PKT state 1302, the state machine transitions to DETECT_MLP state 1303 when data is available to be sent from the current window. In such a case, the state machine detects the maximal length packet and its corresponding first and last double word indices within a 32-byte window segment.

DETECT_MLP state 1303 searches 32B window segments to construct the MLP for transmission. That is, the state machine detects the MLP across the entire window from the MLPs found across segments within a window. While in the DETECT_MLP state 1303, the state machine transitions to the WAIT_FOR_DP_MUX_OK state 1304 while waiting for the write combining data that is to be flushed to become available.

In the WAIT_FOR_DP_MUX_OK state 1304, the state machine waits for the write-combining data for window flushes to be available before attempting to flush the write-combining window. If the write combining data for a window to be flushed is available and the state machine is in the DETECT_MLP state 1303, the state machine transitions to ADV_HDR_AVAIL state 1305. Similarly, if the state machine is in the WAIT_FOR_DP_MUX_OK state 1304 and write combining data for window is available, the state machine transitions to ADV_HDR_AVAIL state 1305.

In ADV_HDR_AVAIL state 1305, the state machine advertises header availability to the downstream PCI-Express packet generator logic that is responsible for enforcing PCI-Express ordering, PCI-Express credit availability checks and TLP formulation.

After indicating that the header is available, the state machine transitions from state is set from ADV_HDR_AVAIL state 1305 to FORM_HDR state 1306. At FORM_HDR state 1306, the state machine formulates the PCI-Express packet header and provides the header in response to a read header strobe. While in the FORM_HDR state 1306, the state machine increments the read pointer to the write combining data FIFO in response to a pop data strobe and reads the write combining data from the FIFO in response to a read data strobe. In response to a pop header event, the state machine transitions from FORM_HDR state 1306 to RD_DATA state 1307. In RD_DATA state 1307, the state machine provides the data payload from the write-combining window for TLP formulation.

The state machine stays in the RD_DATA state 1307 while the data flush for the current MLP is incomplete and transitions to the DETECT_SEG_PKT state 1302 when the data flush for the current MLP is complete.

Figure 14:
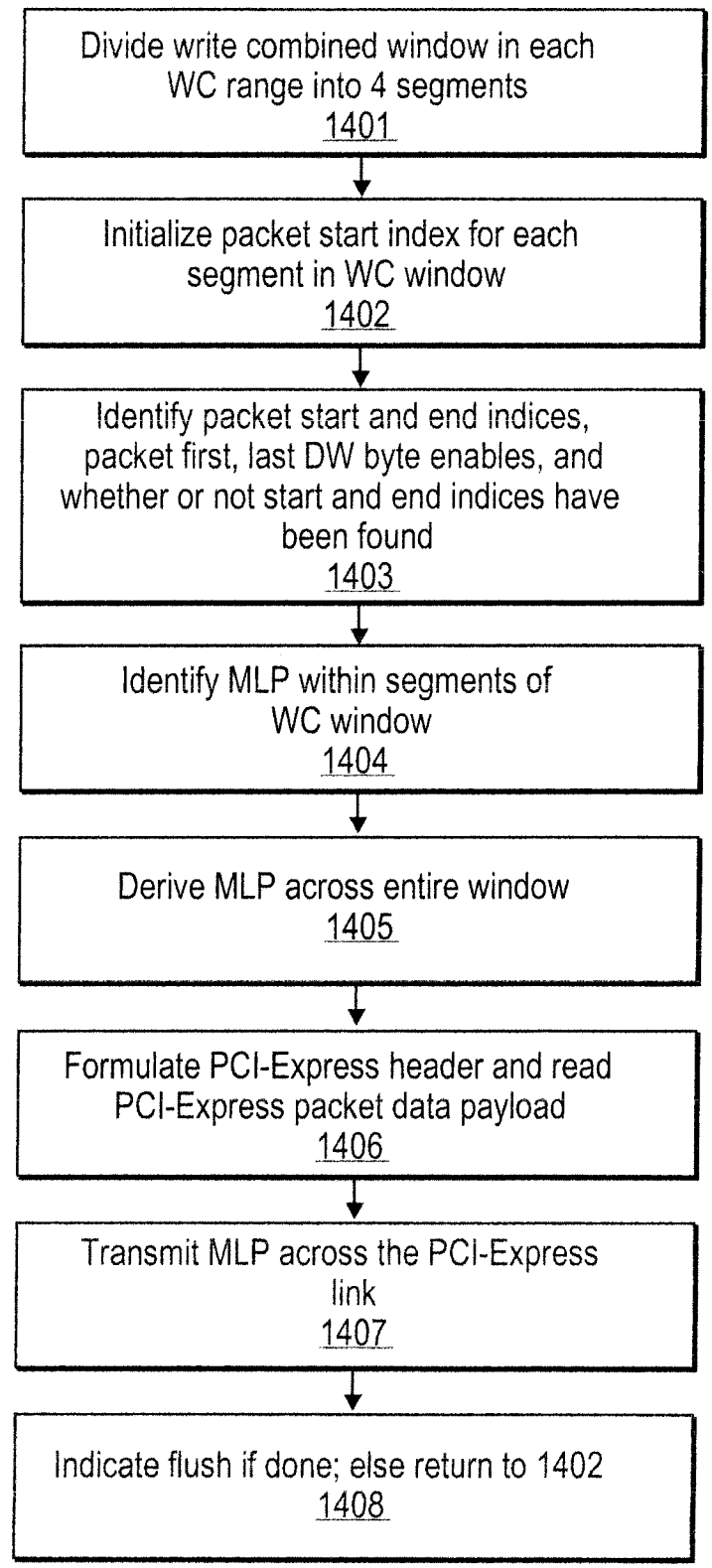
FIG. 14 is a flow diagram of one embodiment of a process for performing flushing using maximal length packets.

FIG. 14 is a flow diagram of one embodiment of a process for performing flushing using maximal length packets. The process performed by processing logic, which may comprise hardware (e.g., the circuitry, dedicated logic, etc.), software (such as by general purpose computer system or a dedicated machine), or a combination of both.

Referring to FIG. 14, the process begins by processing logic dividing the write combining window in each of the WC ranges into four segments, each of 32B (processing block 1401).

Processing logic then initializes the packet start index for each of the segments with the WC window (processing block 1402). The packet start index indicates the current starting index for the maximal length search in the BE vector.

For each of the segments in the WC window, processing logic identifies (a) the packet start index, (b) the packet end index, (c) the packet first DW BE, (d) the packet last DW BE, (e) whether the packet start index has been found and (f) whether the packet end index has been found (processing block 1403).

Next, processing logic identifies the MLP within the segments of the WC window segment (processing block 1404). In one embodiment, this is performed using the code set forth below.

Afterwards, processing logic uses the MLP detected within segments in a window in processing block 1402 to derive an MLP across the entire window (processing block 1405). In one embodiment, this is performed using the code set forth below (set forth below). Note that "derv_packet_XXXXX" refers to the MLP across window segments.

At the end of processing block 1405, "derv_packet_start_ndx" and "derv_packet_end_ndx" represent the start and the end of the current MLP determined across the entire window, respectively.

Processing logic uses serv_packet_start_ndx and derv_packet_end_ndx to formulate the PCI-Express packet header and read PCI-Express packet data payload from WC data FIFO (processing block 1406).

Once complete, processing logic transmits the maximal length packet across the PCI-Express link (processing block 1407).

If the entire WC window has been parsed and all MLPs flushed across the link, processing logic indicates window flush is done (processing block 1408); processing logic transitions to processing block 1402.

In one embodiment, the MLP for each write-combining window may be detected using the following detection code:

```
For each Segment-segX : X{0,1,2,3}within a WCW {
    for (i = 0; I <= high_water_mark_on_segX; i=i+4) {
        if ( ( i >= segX_packet_start_index ) &&
            (segX_pkt_start_ndx_found == 1'b0)
        {
            is_start_dw_be_contg( );
            is_start_dw_be_full( );
            is_start_dw_be_empty( );
            //Parse DW BE information
            if ( ~segX_start_dw_be_contg &
~segX_start_dw_be_empty) { //Identify single DW Pkt
                // and corresponding start &
                // end index
                segX_first_dw_be = be_vect[i+3:i];
                segX_last_dw_be = 0
                segX_packet_end_ndx_found = TRUE
                segX_end_dw_ndx = i;
                segX_packet_start_ndx_found = TRUE
                segX_start_dw_ndx = i;
            }
            else if (segX_start_dw_be_contg) { // Identify start
                DW BE
                // and start index
                segX_firstdw_be = be_vect[I+3:I];
                segX_packet_start_ndx_found = TRUE;
                segX_start_dw_ndx = I;
            }
        }
        else if ( ( segX_packet_start_ndx_found == TRUE) &&
            (segX_packet_end_ndx_found == FALSE) ) {
                //identify end DW BW and end
                index
                is_end_dw_be_contg( );
                is_end_dw_be_full( );
                is_end_dw_be_empty( );
                segX_prv_dw_ndx = be_vec[I-1:I-4];
                if (~segX_end_dw_be_full) {
    if (~segX_end_dw_be_empty) {// Assign last DW BE
                //based on contiguity
                //check and packet
                length
                segX_last_dw_be = seg/x_eng_dw_be_contg
                    ? be_vect[I=3:I]
    ( (segX_prv_dw_ndx == segX_start_dw_ndx) ? 0 :
    be_vect[segX_prv_dw_ndx+3: segX_prv_dw_ndx] );
                segX_packet_end_ndx_found = TRUE;
                segX_end_dw_ndx = segX_end_dw_be_contg ? I :
                segX_prv_dw_ndx;
            }
            else if (segX_end_dw_be_empty) {
                segX_last_dw_be = (segX_prv_dw_ndx ==
segX_start_dw_ndx) ? 0 : be_vect[segX_prv_dw_ndx=3:
segX_prv_dw_ndx
                ==
                segX_packet_end_ndx_found = TRUE;
                segX_end_dw_ndx = segX_prv_dw_ndx;
            }
        }
    }
    segX_win_bound_dw_be_full = is_dw_be_full
        (be_vec[high_water_mark_segX-1:high_water_mark_segX-4]);
    //Identifies MLP when all DW BE in a segement are active and
    //single DW packet ending at segment boundaries
    if ( ( ( segX_packet_start_ndx_found == TRUE) &&
        (segX_packet_end_ndx_found ++ FALSE) ) {
        if ( segX_win_bound_dw_be_full && ( segX_start_dw_ndx ! =
            (high_water_mark_segX - 4)) ) {
            segX_last_dw_be = be_vect[high_water_mark_segX-
                1:high_water_mark_segX-4];
            segX_packet_end_ndx_found = TRUE;
            segX_end_dw_ndx = ( High_water_mark_segX - 4);
        }
        else if ( ( segX_win_bound_dw_be_full && ( segX_start_dw_ndx ==
            high_water_mark_on_segX )
            | | segX_win_bound_dw_be_full ) {
            segX_last_dw_be = 0;
            segX_packet_end_ndx_found = TRUE;
            segX_end_dw_ndx = segX_start_dw_ndx;
        }
    }
}
```

In one embodiment, the MLP may be selected-across all write-combining windows using the following:

```
if ( seg0_packet_start_ndx_found = TRUE ) { // segment 0 search
    derv_packet_start_ndx = seg0_start_dw_ndx;
    derv_packet_first_dw_be = seg0_first_dw_be;
    derv_packet_end_ndx = seg0_end_dw_ndx;
    derv_packet_last_dw_be = seg0_last_dw_be
    if ( is_comb_across_seg_possible(seg0, seg1) ) {//check for BE
        continuity across
            //segment boundary to form
            //MLP across seg0 and seg1 (a)
        derv_packet_end_ndx = ( (is_seg1_first_dw_be_full) &&
(~is_seg1_last_dw_be_empty) ) ? seg1_end_dw_ndx : seg1_start_dw_ndx;
        derv_packet_last_dw_be = ( (is_seg1_first_dw_be_full) &&
(~is_seg1_last_dw_be_empty) ) ? seg1_last_dw_be : seg1_first_dw_be;
        if (is_comb_across_seg_possible (derv_packet, seg2) {
            //Use info fro (A)
            //to form MLP across
            //seg0,1,2 (B)
            derv_packet_end_ndx = ( (is_seg2_first_dw_be_full) &&
(~is_seg2_last_dw_be_empty)) ? seg2_end_dw_ndx : seg2_start_dw_ndx;
            derv_packet_last_dw_be = ( (is_seg2_first_dw_be_full) &&
(~is_seg2_last_dw_be_empty) ) ? seg2_last_dw_be : seg2_first_dw_be;
            if (is_comb_across_seg_possible(derv_packet, seg3) ) {
                //Use info from (B)
                //to form MLP across
                //seg0,1,2,3 i.e. across the entire
                //window for a given WCR
                //within a port
                derv_packet_end_ndx = ( (is_seg3_first_dw_be_full) &&
(~is_seg3_last_dw_be_empty) ) ? seg3_end_dw_ndx : seg3_start_dw_ndx;
                derv_packet_last_dw_be = ( (is_seg3_first_dw_be_full) &&
(~is_seg3_last_dw_be_empty) ) ? seg3_last_dw_be : seg3_first_dw_be;
            }
        }
    }
}
else if ( seg1_packet_start_ndx_found = TRUE ) {//Start segment 1 search
                                /since no valid start/end index is
                                //obtained from segment 0 search
    derv_packet_start_ndx = seg1_start_dw_ndx;
    derv_paket_first_dw_be = seg1_first_dw_be;
    derve_packet_end_ndx =seg1_end_dw_ndx;
    derve_packet_last_dw_be =seg1_last_dw_be;
    if ( is_comb_across_seg_possible (seg1, seg2) ) { {
                //check for BE continuity across
                //segment boundary to form
                //MLP across seg1 and seg2 (A)
        derv_packet_end_ndx = ( (is_seg2_first_dw_be_full) &&
(~is_seg2_last_dw_be_empty) ) ? seg2_end_dw_ndx : seg2_start_dw_ndx;
        derv_packet_last_dw_be = ( (is_seg2_first_dw_be_full) &&
(~is_seg2_last_dw_be_empty) ) ? seg2_last_dw_be : seg2_first_dw_be;
```

-continued

```
        if ( is_comb_across_seg_possible(derv_packet, seg3) ) {
            derv_packet_end_ndx =( (is_seg3_first_dw_be_full) &&
(~is_seg2_last_dw_be_empty) ) ? seg2_last_dw_be : seg2_first_dw_be;
            derv_packet-last_dw_be = ( (is_seg3_first_dw_be_full) &&
(~is_seg3_last_dw_be_empty) ) ? seg3_last_dw_be : seg3first_dw_be;
        if (is_comb_across_seg_possible (derv_packet, seg2) {
                                //Use info from (A)
                                //to form MLP across
                                //seg0, 1,2 (B)
            derv_packet_end_ndx = ( (is_seg2_first_dw_be_full) &&
            (~is_seg2_last_dw_be_empty) ) ? seg2_end_dw_ndx    :
                seg2_start_dw_ndx;
            derv_packet_last_dw_be = ( (is_seg2_first_dw_be_full) &&
(~is_seg2_last_dw_be_empty) ) ? seg2_last_dw_be : seg2_first_dw_be;
            if (is_comb_across_seg_possible(derv_packet, seg3) ) {
                                //Use info from (B)
                                //to form MLP across
                                //seg0,1,2,3 i.e across the entire
                                //window for a given WCR/within a port
                derv_packet_end_ndx = ( (is_seg3_first_dw_be_full)
                    &&
                (~is_seg3_last_dw_be_empty) ) ? seg3_end_dw_ndx :
                    seg3_start_dw_ndx;
                derv_packet_last_dw_be = ( (is_seg3_first_dw_be_full) &&
(~is_seg3_last_dw_be_empty) ) ? seg3_last_dw_be : seg3_first_dw_be;
                }
            }
        }
    }
    else if (seg2_packet_start_ndx_found = TURE) {// Start segment 2 search
                            //since no valid start/end index is
                            //obtained from segment 1 search
            derve_packet_start_ndx = seg2_start_dw_ndx;
            derv_packet_first_dw_be = seg2_first_dw_be;
            derve_packet_end_ndx = seg2_end_dw_ndx;
            derve_packet_last_dw_be = seg2_last_dw_be;
        if ( is_comb_across_seg_possible (seg1, seg2) ) {{
                            //check for BE contiguity across
                            //segment boundary to form
                            //MLP across seg1 and seg2     (A)
            derv_packet_end_ndx = ( (is_seg3_first_dw_be_full) &&
(~is_seg3_last_dw_be_empty) )? Seg3_end_dw_ndx : seg3_start_dw_ndx;
            derv_packet_last_dw_be = ( (is_seg3_first_dw_be_full) &&
(~is_seg3_last_dw_be_empty) )? Seg3_last_dw_be : seg3_first_dw_be;
            if (is_comb_across_seg_possible(derv_packet, seg3) ) {
                derv_packet_end_ndx = ( (is_seg3_first_dw_be_full) &&
                (~is_seg3_last_dw_be_empty) ) ? seg3_end_dw_ndx :
                    seg3_start_dw_ndx;
                derv_packet_last_dw_be = ( (is_seg3_first_dw_be_full) &&
(~is_seg3_last_dw_be_empty) ) ? seg3_last_dw_be : seg3_first_dw_be;
                }
            }
        }
    else if (seg2_packet_start_ndx_found = TRUE ) { //Start segement 2 search
                            //since no vlid start/end index is
                            //obtained from segment 2 search
            derv_packet_start_ndx = seg3_start_dw_ndx;
            derv_packet_first_dw_be = seg3_first_dw_be;
            derv_packet_end_ndx = seg3_end_dw_ndx;
            derv_packet_last_dw_be = seg3_last_dw_be;
        if ( is_comb_across_seg_possible (seg2, seg3) {
            derv_packet_end_ndx = ( (is_seg3_first_dw_be_full) &&
            (~is_seg3_last_dw_be_empty) ) ? seg3_end_dw_ndx :
                seg3_start_dw_ndx;
            derv_packet_last_dw_be = ( (is_seg3_first_dw_be_full) &&
(~is_seg3_last_dw_be_empty) ) ? seg3_last_dw_be : seg3_first_dw_be;
            }
        }
    else if (seg2_packet_start_ndx_found = TRUE ) { //Start segement 2 search
                            //since no vlid start/end index is
                            //obtained from segment 2 search
            derv_packet_start_ndx = seg3_start_dw_ndx;
            derv_packet_first_dw_be = seg3_first_dw_be;
            derv_packet_end_ndx = seg3_end_dw_ndx;
            derv_packet_last_dw_be = seg3_last_dw_be;
            }
            else {
//MLP search did not locate a valid start/end index for a WC flush
                            //Signal window flush is done
```

Thus, in searching for maximum length packets, the search attempts to search all windows to find out if the packet starting at the very beginning is the maximum length packet having consecutive bits set so that it can be sent out on the PCI Express link.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
    write-combining an outbound write transaction intended for transfer of associated data from system memory to an input/output (I/O) device by storing the associated data within a write-combinable buffer, the write-combinable buffer assigned to a range of addresses within a memory address space that is mapped to the I/O device in a memory-mapped Input/Output (MMIO) fashion, the range of addresses being a write-combinable range of addresses that include a set of one or more write-combining windows, each representing a contiguous address space within the range of addresses, and wherein each of the set of write-combining windows is established by a first write operation that falls within the range of addresses that is aligned on cache line boundaries, wherein said write-combinable buffer is a component integrated in a memory controller;
    detecting a doorbell register flush request for the I/O device within the memory address space mapped to the I/O device, wherein, the I/O device's device driver software directs the flushing of the write-combinable buffer by initiating the flush request;
    identifying the buffer based on the flush request's location within the memory address space mapped to the I/O device; and
    flushing the data contents of the buffer to the I/O.

2. The method of claim 1 further comprising:
    performing the write combining in response to the transaction address associated with the flush request falling within a write-combinable range of addresses assigned to the I/O device.

3. The method of claim 2, wherein the data contents of the write-combinable buffer are flushed to the I/O device and the transaction data is stored within the write-combinable buffer if an address range associated with an open write-combining window corresponds to the transaction address of the write transaction, and the transaction address falls within the data address within the assigned write-combining buffer.

4. The method of claim 3, wherein a set of one or more write-combinable buffers of said memory controller are flushed in linearly increasing order toward said I/O hub.

5. The method of claim 4, wherein each of the set of write-combining windows is re-established during subsequent write operations that fall within the write-combinable range, but fall outside a previous write-combining window within the write-combinable range.

6. The method of claim 1 wherein the transaction is a write transaction.

7. The method of claim 6, wherein multiple write-combinable ranges may be established within the MMIO address space mapped to the I/O device.

8. A semiconductor chip, comprising:

a memory controller having an interface to a system memory and a write-combinable buffer, said memory controller also having circuitry to write-combine an outbound write transaction intended for transfer of associated data from the system memory to an input/output (I/O) device by storing the associated data within the write-combinable buffer, the write-combinable buffer assigned to a range of addresses within a memory address space mapped to the I/O device in a memory-mapped input/output (MMIO) fashion, the range of addresses being a write-combinable range of addresses that include a set of one or more write-combining windows, each representing a contiguous address space within the range of addresses, and wherein each of the set of write-combining windows is established by a first write operation that falls within the range of addresses that is aligned on cache line boundaries, the circuitry to also perform the following upon a doorbell register flush request for the I/O device within the memory address space mapped to the I/O device being detected, wherein, the I/O device's device driver software directs the flushing of the write-combinable buffer by initiating the flush request:

identify the buffer based on the flush request's location within the memory address space mapped to the I/O device; and flush the data contents of the buffer to the I/O device.

* * * * *

UNITED STATES PATENT AND TRADEMARK OFFICE
CERTIFICATE OF CORRECTION

PATENT NO.        : 8,468,278 B2                                    Page 1 of 1
APPLICATION NO.   : 11/966760
DATED             : June 18, 2013
INVENTOR(S)       : Radhakrishnan et al.

It is certified that error appears in the above-identified patent and that said Letters Patent is hereby corrected as shown below:

In the Specifications

In column 1, at line 8 after, -- of -- delete "claims".

Signed and Sealed this
Twenty-second Day of April, 2014

Michelle K. Lee
*Deputy Director of the United States Patent and Trademark Office*